(12) United States Patent
Hakeem et al.

(10) Patent No.: US 12,479,758 B1
(45) Date of Patent: Nov. 25, 2025

(54) DEVELOPMENT OF OXYNITRIDE GLASS-CERAMICS PREPARATIONS AND USES THEREOF

(71) Applicant: KING FAHD UNIVERSITY OF PETROLEUM AND MINERALS, Dhahran (SA)

(72) Inventors: Abbas Saeed Hakeem, Dhahran (SA); Sharafat Ali, Dhahran (SA); Muhammad Ali Ehsan, Dhahran (SA); Natalia Anna Wojcik, Dhahran (SA); Md Abdul Aziz, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/986,964

(22) Filed: Dec. 19, 2024

(51) Int. Cl.
  *C03C 10/00* (2006.01)
  *C03B 19/06* (2006.01)
  *C03C 4/14* (2006.01)
  *C03C 14/00* (2006.01)

(52) U.S. Cl.
  CPC ............ *C03C 10/00* (2013.01); *C03B 19/063* (2013.01); *C03C 4/14* (2013.01); *C03C 14/002* (2013.01); *C03C 2204/00* (2013.01); *C03C 2214/02* (2013.01); *C03C 2214/20* (2013.01)

(58) Field of Classification Search
  CPC .............................. C03C 4/14; C03C 2214/20
  See application file for complete search history.

(56) References Cited

U.S. PATENT DOCUMENTS

| 4,186,021 A | 1/1980 | Chyung et al. |
| 11,492,257 B1 | 11/2022 | Hakeem et al. |

FOREIGN PATENT DOCUMENTS

| JP | 62-279938 A | 12/1987 |
| JP | 10-001327 A | 1/1998 |

OTHER PUBLICATIONS

Zhenjun Qing, et al., "Microstructure and properties of ZnO doped CaO—Al2O3—SiO2 ceramic for LTCC applications", Journal of Materials Science: Materials in Electronics. Vol. 26, Dec. 9, 2014, pp. 1512-1517, 7 pages.

Xu Bo, et al., "Influence of CaO and ZnO Content on the Crystallization and Foaming of CaO—Al2O3—SiO2 Glass-ceramics", Journal of Inorganic Materials, vol. 27, No. 2, 2012, pp. 191-194, 1 page.

*Primary Examiner* — Khanh T Nguyen
(74) *Attorney, Agent, or Firm* — Oblon, McClelland, Maier & Neustadt, L.L.P.

(57) ABSTRACT

A glass-ceramic material includes an oxynitride glass with a chemical formula $Ca_7Al_{14}Si_{17}OsN_7$ and zinc oxide. The zinc oxide is present in an amount of 8 to 16 percent by weight based on the total weight of the glass-ceramic material. The zinc oxide is doped in the oxynitride glass. The glass-ceramic material has one or more conductive channels having a length of 100 to 1000 μm and a width of 0.5 to 10 μm.

20 Claims, 25 Drawing Sheets

DEVELOPMENT OF OXYNITRIDE GLASS-CERAMICS PREPARATIONS AND USES THEREOF

CROSS-REFERENCE TO RELATED APPLICATION

The present disclosure claims the benefit of Saudi Patent Application No. 1020247067, filed Dec. 12, 2024, with the Saudi Authority for Intellectual Property Office, which is incorporated herein by reference in its entirety.

STATEMENT REGARDING PRIOR DISCLOSURE BY THE INVENTORS

Aspects of the present disclosure are described in Hakeem, A. S. et al., "Evaluating the impact of ZnO doping on electrical and thermal properties of calcium-aluminosilicate oxynitride glass-ceramics" published in Issue 20, Ceramics International, which is incorporated herein by reference in its entirety.

STATEMENT OF ACKNOWLEDGEMENT

Support provided by the Interdisciplinary Research Center for Hydrogen Technologies and Carbon Management, King Fahd University of Petroleum and Minerals, Saudi Arabia, through Project INHE2210 is gratefully acknowledged.

BACKGROUND

Technical Field

The present disclosure is directed to zinc oxide-doped oxynitride glass-ceramic(s) of a calcium-aluminum-silicon-oxygen-nitrogen (Ca—Al—Si—O—N) (CASON) system, a method of preparation, and its uses thereof.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Glass-ceramics (also known as vitroceramics, pyrocerams, and sittals) are formed through the controlled crystallization of glass. Advantageous properties may be obtained by controlling the chemical composition and processing parameters of glass-ceramics materials. These materials have applications across consumer electronics, healthcare, and home appliances due to their strength, thermal and chemical stabilities, and optical clarity. Examples include smartphones and display screens, optical lenses, laser gain media, dental and medical devices, nuclear waste immobilization, electronic substrates and components, as well as cookware and kitchen appliances.

A $Li_2O$—$Al_2O_3$—$SiO_2$ (LAS) system with additional components, such as CaO, MgO, ZnO, BaO, $P_2O_5$, $Na_2O$ and $K_2O$, is a glass-ceramics composition used in cookware, electronic and optical devices, and production process equipment. Fining agents, which may be used in glass-ceramics to remove bubbles, alter crystallinity, and/or improve transparency, include $As_2O_5$ and $SnO_2$. $ZrO_2$, in combination with $TiO_2$, are commonly used nucleation agents [Zannoto, E. D., A bright future for glass-ceramics, American Ceramic Society Bulletin, 2010, 89 (8), 19-27]. ZnO is a nucleation agent used in preparing glass-ceramics and modifies the chemical and physical properties of silicate-based oxide glasses. ZnO occupies a large position among semiconductor materials of groups II-VI, with a wide bandgap of approximately 3.37 eV. ZnO has good chemical and mechanical stability, is relatively non-toxic, and is largely available in nature [Liu, Y. et al., ZnO-Based Transparent Conductive Thin Films: Doping, Performance, and Processing, Journal of Nanomaterials, 2013, 196521; and Lee, S. et al., Impact of transparent electrode on photoresponse of ZnO-based phototransistor, Applied Physics Letters, 2013, 103]. The ability of ZnO to simultaneously achieve high optical transmittance in the visible spectrum and low resistivity makes it a good material for the production of new-generation optoelectronic devices, heat mirrors for gas stoves, conductive coatings for aircraft windows to prevent surface icing, and thin-film electrodes in amorphous silicon solar cells [Wisz, G. et al., Structural, Optical and Electrical Properties of Zinc Oxide Layers Produced by Pulsed Laser Deposition Method, Nanoscale Research Letters, 2017, 12, 253; and Zheng, Z. Q. et al., Light-controlling, flexible, and transparent ethanol gas sensor based on ZnO nanoparticles for wearable devices, Scientific Reports, 2015, 5, 11070]. ZnO can act as a glass modifier as an octahedral unit, $[ZnO_6]^-$, or as a tetrahedral unit, $[ZnO_4]^-$, in the glass-ceramic depending on the concentration of the ZnO and alkali/alkaline oxides. Beyond the glass-modifying properties of ZnO, it also enhances density, improves glass fluidity, lowers the crystallization temperature, and may positively impact the final glass-ceramic mechanical properties [Li, Z. et al., Effect of ZnO on the crystallization behavior and properties of $SiO_2$—CaO—$Al_2O_3$—$Fe_2O_3$ glass-ceramics prepared from simulated secondary slag after reduction of copper slag, Ceram. Int., 2022, 48, 21245-21257; Gui, H. et al., Glass forming, crystallization, and physical properties of MgO—$Al_2O_3$—$SiO_2$—$B_2O_3$ glass-ceramics modified by ZnO replacing MgO, J. Eur. Ceram. Soc., 2019, 39, 1397-1410; and Dechandt, I. C. J. et al., Sinterability and mechanical properties of glass-ceramics in the system $SiO_2$—$Al_2O_3$—MgO/ZnO, J. Eur. Ceram. Soc., 2020, 40, 6002-6013]. The introduction of ZnO results in an increased porosity in glass-ceramics and promotes the formation of new crystalline phases, adversely affecting the chemical properties of the glass-ceramics compared to glass-ceramics without ZnO. There is an interest in developing lighter, multi-component, and hierarchically structured oxynitride glass-ceramics with enhanced mechanical, thermal, and electrical properties; however, compared to oxide glass-ceramics, research in oxynitride glass-ceramics remains limited. Existing oxynitride glass-ceramics have been prepared using traditional heat-treatment techniques, in which the parent glass is crystallized by nucleation followed by crystal growth during the stepwise heat treatment in the furnace. This process is generally carried out at atmospheric pressure, and heating rates typically range between 5-50° C./min, making the process time-consuming. This limitation hampers the extent and scope of microstructure and property optimization for these materials [Dinger, T. R., Microstructure Development during Controlled Crystallization of M-Si—O—N Glass-Ceramics, Mater. Sci. Forum., 1991, 47, 119-131; Hampshire, S., Oxynitride glasses, their properties and crystallisation—a review, J. Non-Cryst. Solids., 2003, 316, 64-73; and Lederer, K. et al., Zirconia-doped Mg—Ca—Al—Si—O—N glasses: crystallization, J. Non-

*Cryst. Solids.*, 1998, 224, 109-121]. Preparation of Li-doped Ca—Al—Si—O—N glasses using the spark plasma sintering technique (SPS) has demonstrated efficiency in accelerating the crystallization step of bulk glasses compared to traditional ventilated furnaces [Sharafat, A. et al., Formation and properties of nitrogen-rich strontium silicon oxynitride glasses, *J. Mater. Sci.*, 2009, 44, 664-670; and Hubert, M. et al., An innovative approach to develop highly performant chalcogenide glasses and glass-ceramics transparent in the infrared range, *Opt. Express*, 2011, 19, 23513-23522].

U.S. Pat. No. 11,492,257B1 discloses a method of forming an alkali metal-doped calcium-SiAlON material using spark plasma sintering (SPS), which includes mixing calcium-SiAlON powder and an alkali metal hydroxide to form a reaction mixture. U.S. Pat. No. 4,186,021A discloses the preparation of glass-ceramic articles from thermally crystallizable precursor glasses having compositions containing $SiO_2$ and nitrogen as base components. JP10001327A discloses a glass substrate comprising a magnetic layer on an oxynitride glass substrate for a recording medium with good heat resistance, flatness, and strength.

Although several glass-ceramic materials have been developed in the past, no reports on the effect of Zn in oxynitride glass ceramics have been explored. Accordingly, an objective of the present disclosure is to prepare ZnO-doped $Ca_7Al_{14}Si_{17}O_{52}N_7$ glass-ceramic materials that may circumvent drawbacks of the art with enhanced microstructure, density, thermal conductivity, thermal expansion coefficient, and electrical properties.

SUMMARY

In an exemplary embodiment, a glass-ceramic material is described. The glass ceramic material includes an oxynitride glass with a chemical formula $Ca_7Al_{14}Si_{17}O_{52}N_7$ and zinc oxide. The zinc oxide is present in an amount of 8 to 16 percent by weight based on a total weight of the glass-ceramic material and the zinc oxide is doped in the oxynitride glass. The glass-ceramic material has one or more conductive channels having a length of 100 to 1000 μm and a width of 0.5 to 10 μm.

In some embodiments, the one or more conductive channels have one or more distributary channels, and the conductive channels form a conductive network. The one or more conductive channels comprise voids having a length of 0.5 to 5 μm and a width of 0.1 to 0.5 μm.

In another embodiment, a process for preparing the glass-ceramic material is described. The process includes heating a calcium oxide, an aluminum oxide, a silicon oxide, and a silicon nitride in an inert atmosphere to a temperature of 1500 to 1700° C. to form an oxynitride glass, grinding the oxynitride glass, adding zinc oxide to the ground oxynitride glass to form a mixture, sintering the mixture at a pressure of 15 to 25 MPa and to a temperature of 500 to 1000° C. at a heating rate of 50 to 200° C./minute to form the glass-ceramic material, and polishing the glass-ceramic material.

In some embodiments, the sintering of the mixture is by a spark plasma sintering process.

In some embodiments, the glass-ceramic material has a density of 2.75 to 2.95 g $cm^{-3}$.

In some embodiments, the glass-ceramic material has a thermal expansion of 4.5 to 5.0 ppm $\mu m^{-1}$.

In some embodiments, the glass-ceramic material has a thermal conductivity of 1.5 to 1.75 W $m^{-1}$ $K^{-1}$.

In some embodiments, the glass-ceramic material has an atomic ratio of aluminum to aluminum and silicon of 0.4 to 0.5.

In some embodiments, the glass-ceramic material further comprises europium.

In some embodiments, the glass-ceramic material further comprises carbon nanotubes.

In some embodiments, the glass-ceramic material has 9 percent by weight zinc oxide and an activation energy of 0.6 to 0.8 eV.

In some embodiments, the glass-ceramic material has 15 percent by weight zinc oxide and an activation energy of 0.3 to 0.5 eV.

In some embodiments, the glass-ceramic material has a DC conductivity value of 0.1 to 0.3 S/cm.

In some embodiments, the conductive channels form a conductivity path that is an electron transfer path.

In some embodiments, the glass-ceramic material has 9 percent by weight zinc oxide and a hopping energy of 0.2 to 0.3 eV.

In some embodiments, the glass-ceramic material has 9 percent by weight zinc oxide and a structural disorder energy between jump sites of 0.8 to 1.0 eV.

In some embodiments, the glass-ceramic material has 15 percent by weight zinc oxide and a hopping energy of 0.1 to 0.2 eV.

In some embodiments, the glass-ceramic material has 15 percent by weight zinc oxide and a structural disorder energy between jump sites of 0.4 to 0.6 eV.

In some embodiments, the glass-ceramic material is conductive from 200 to 550 K.

These and other aspects of the non-limiting embodiments of the present disclosure will become apparent to those skilled in the art upon review of the following description of specific non-limiting embodiments of the disclosure in conjunction with the accompanying drawings. The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure (including alternatives and/or variations thereof) and many of the attendant advantages thereof will be readily obtained as the same becomes better understood by reference to the following detailed description when considered in connection with the accompanying drawings, wherein.

DETAILED DESCRIPTION

Figure 1:
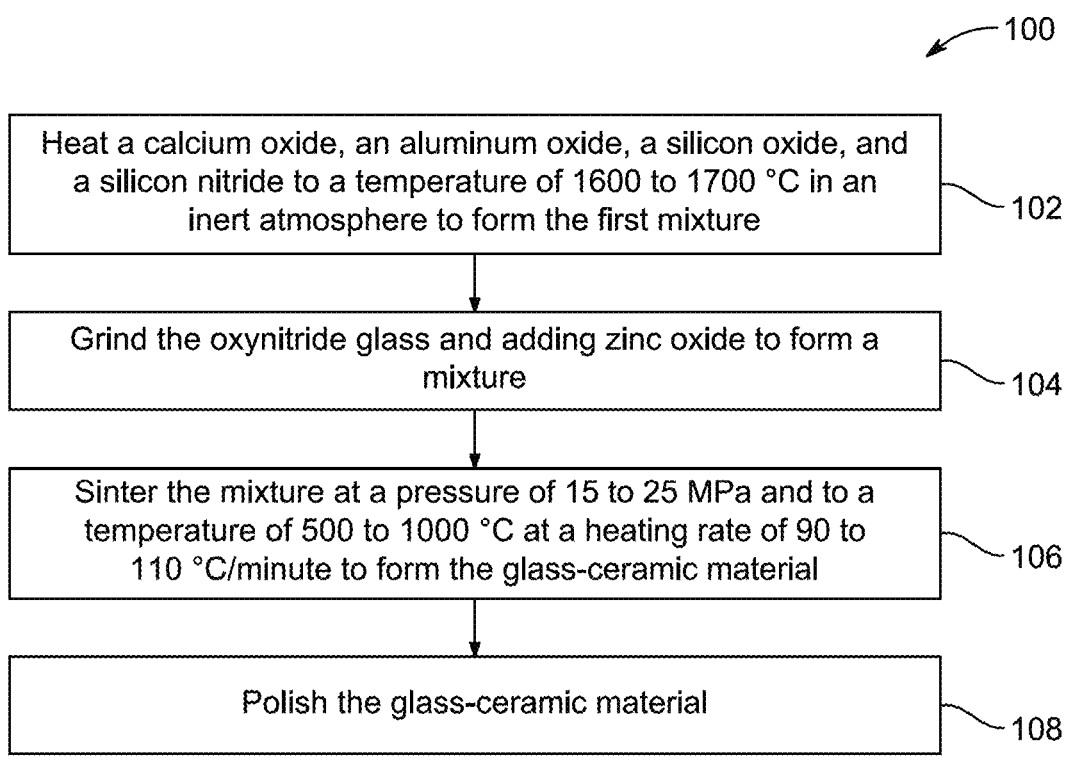
FIG. 1 is a flowchart depicting a method of forming a glass-ceramic material, according to certain embodiments.

In the following description, it is understood that other embodiments may be utilized, and structural and operational changes may be made without departure from the scope of the present embodiments disclosed herein.

Reference will now be made to specific embodiments or features, examples of which are illustrated in the accompanying drawings. In the drawings, whenever possible, corresponding or similar reference numerals will be used to designate identical or corresponding parts throughout the several views. Moreover, references to various elements described herein are made collectively or individually when there may be more than one element of the same type. However, such references are merely exemplary in nature. It may be noted that any reference to elements in the singular may also be constructed to relate to the plural and vice-versa without limiting the scope of the disclosure to the exact number or type of such elements unless set forth explicitly in the appended claims.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all embodiments of the disclosure are shown.

In the drawings, reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "oxynitride glass(es)" refers to materials formed by the replacement of oxygen atoms by nitrogen in silicate and aluminosilicate glasses in various M-Si—O—N, M-Si—Al—O—N, and M-Si—Mg—O—N systems, where M is a modifying cation such as Mg, Ca, Ba, Sc, Y, and rare earth lanthanides. Oxynitride glasses are silicate or aluminosilicate glasses in which oxygen atoms in the glass network are partially replaced by nitrogen atoms. As nitrogen increases, glass transition temperature, elastic modulus, viscosity, and hardness increase while a thermal expansion coefficient decreases. As used herein, an oxynitride glass may be those made of $Ca_7Al_{14}Si_{17}O_{52}N_7$.

As used herein, the term "spark plasma sintering (SPS)" refers to a technique for consolidating powder materials by the application of pulsed direct current and axial pressure concurrently to achieve a bulk of a material at a fast rate. SPS also refers to a sintering technique that is used to synthesize glass ceramic materials. SPS is a sintering technique for the densification of ceramic matrix composites. SPS may use pulsed or unpulsed DC or AC current to directly pass current through a graphite die and a powder compact to form a product.

As used herein, the samples may be "glass" or "pristine glass" without zinc oxide (0Zn) in $Ca_7Al_{14}Si_{17}O_{52}N_7$, "zinc oxide-doped oxynitride glass," $Ca_7Al_{14}Si_{17}O_{52}N_7$, also referred as "ceramic glasses," with doping such as 3Zn (3 wt. % ZnO), 6Zn (6 wt. % ZnO), 9Zn (9 wt. % ZnO), 15Zn (15 wt. % ZnO), and 15ZnC (15 wt. % ZnO doped with carbon nanotubes).

As used herein, "0Zn" is referred to as pristine glass or glass, while "3Zn," "6Zn," "9Zn," "15Zn," and "15ZnC" are referred to as glass-ceramics comprising $Ca_7Al_{14}Si_{17}O_{52}N_7$ doped with 3 wt. % ZnO, 6 wt. % ZnO, 9 wt. % ZnO, 15 wt. % ZnO, and 15 wt. % ZnO doped with carbon nanotubes, respectively.

As used herein, "$\sigma_{DC}$" denotes the frequency-independent direct current (DC) conductivity, and its dependance with frequency part of conductivity is denoted as "$\sigma'(\omega)$," given by Jonscher power law as in Eq. 1.

As used herein, the parameters are calculated as per the equations shown in the examples and references therein.

The present disclosure is intended to include all hydration states of a given compound or formula, unless otherwise noted or when heating a material.

Unless otherwise noted, the present disclosure is intended to include all isotopes of atoms occurring in the glasses and ceramic glasses used herein. Isotopes include those atoms having the same atomic number but different mass numbers.

Aspects of the present disclosure are directed to ZnO-doped $Ca_7Al_{14}Si_{17}O_{52}N_7$ glass-ceramic materials prepared by a spark plasma sintering (SPS) technique. The effect of ZnO on microstructure, density, thermal conductivity, thermal expansion coefficient, and electrical properties are evaluated. Addition of ZnO to the glass or glass-ceramic materials has an impact on the electrical conductivity of the glass-ceramic materials and may find application in advanced engineering and energy storage.

A glass-ceramic material is described. The glass ceramic material includes an oxynitride glass with a chemical formula $Ca_7Al_{14}Si_{17}O_{52}N_7$. Oxynitride glasses are types of silicates or aluminosilicates formed in two systems, and can occur in M-Si—O—N, M1-M2-Si—O—N, M-Si—Al—O—N, and M1-M2-Si—Al—O—N systems where M, M1, and M2 are modifying cations such as alkali metals (Li, Na, K), alkaline earth metals (Mg, Ca, Ba, Sr), Y, La, and rare earth lanthanides. Examples of the oxynitride glasses include, but not limited to, Ca—Si—Al—O—N, Na—Ca—Si—O—N, La—Si—Al—O—N, Li—Na—K—B—Si—O—N, Ce—Si—O—N, Ce—Al—Si—O—N, Na—B—Si—O—N, Li—Si—Al—O—N, Be—Si—Al—O—N, Mg—Si—Al—O—N, Si—Al—O—N, Li—Mg—Si—Al—O—N, Ce—Mg—Si—Al—O—N, Mg—Ba—Si—Al—O—N, Y—Si—Al—O—N, Mn—Si—Al—O—N, Nd—Si—Al—O—N, Na—B—Al—P—O—N, K—Si—O—N, Si-M-O—N(where M is an alkaline earth metal), Si—O—N, Na—Si—O—N, Mg—Si—O—N, La—Si—O—N, silicates (such as Li—Si—O—N and Ca—Si—Al—O—N), borates (such as Na—B—O—N), phosphates (such as Li—P—O—N, Na—P—O—N, K—P—O—N, and Na—Ba—Al—P—O—N), a combination thereof, and the like.

The oxynitride glass is doped with zinc oxide. In some embodiments, oxides that can be used as modifiers apart from zinc oxide include, but not limited to, $B_2O_3$, $SiO_2$, $GeO_2$, $P_2O_5$, $V_2O_5$, $As_2O_3$, $Al_2O_3$, $Sb_2O_3$, $ZrO_2$, $TiO_2$, PbO, BeO, ZnO, MgO, $Li_2O$, BaO, CaO, $Na_2O$, SrO, $K_2O$, combinations thereof, and the like. In some embodiments, oxides that can be used as modifiers may be used in place of or in combination with zinc oxide (ZnO). In a preferred embodiment, the zinc oxide is present in an amount of 8 to 16 percent by weight (wt. %), preferably 1 to 20 wt. %, preferably 2 to 18 wt. %, preferably 3 to 15 wt. %, preferably 6 to 12 wt. %, and preferably 8 to 10 wt. % based on the total weight of the glass-ceramic material. In some embodiments, the zinc oxide has a weight percentage of about 3 wt. %, preferably about 6 wt. %, preferably about 9 wt. %, and preferably about 15 wt. % in the glass ceramic material. The zinc oxide is doped in the oxynitride glass. The glass-ceramic material has one or more conductive channels having a length of 100 to 1000 µm, preferably 200 to 900 µm, preferably 300 to 800 µm, preferably 400 to 700 µm, preferably 500 to 600 µm and a width of 0.5 to 10 µm, preferably 1 to 9 µm, preferably 2 to 8 µm, preferably 3 to 7 µm, preferably 4 to 6 nm. In some embodiments, the glass-ceramic material includes carbon nanotubes. In some embodiments, the glass-ceramic material includes 2 to 20 wt. % carbon nanotubes, preferably 5 to 18 wt. % carbon nanotubes, preferably 8 to 17 wt. % carbon nanotubes, preferably 12 to 16 wt. % carbon nanotubes, and preferably about 15 wt. % carbon nanotubes based on the total weight of the glass-ceramic material.

In some embodiments, the glass-ceramic material has an atomic percentage (at. %) of calcium in the range of 1-10 at. %, preferably 2-9 at. %, preferably 3-8 at. %, more preferably 5-7.2 at. %, and yet more preferably about 6.6-7.2 at. %. In some embodiments, the glass-ceramic material has an atomic percentage (at. %) of aluminum in the range of 10-20 at. %, preferably 11-18 at. %, more preferably 12-16 at. %, and yet more preferably about 13.2-15.9 at. %. In some embodiments, the glass-ceramic material has an atomic percentage (at. %) of silica in the range of 10-20 at. %, preferably 11-18 at. %, preferably 12-16 at. %, more preferably 13-18 at. %, and yet more preferably about 15.9-17.5 at. %. In some embodiments, the glass-ceramic material has an atomic percentage (at. %) of europium in the range of 0-0.2 at. %, preferably 0.05-0.15 at. %, more preferably 0.09-0.12 at. %, and yet more preferably about 0.1-0.11 at. %. In some embodiments, the glass-ceramic material has an atomic percentage (at. %) of oxygen in the range of 50-60 at. %, preferably 52-58 at. %, more preferably 53-55 at. %, and yet more preferably about 53-53.6 at. %. In some embodiments, the glass-ceramic material has an atomic percentage (at. %) of nitrogen in the range of 1-10 at. %, preferably 2-9 at. %, preferably 3-8 at. %, more preferably 4-7.5 at. %, and yet more preferably about 6.6-7.2 at. %.

In an embodiment, the zinc oxide has a weight percentage of 0 wt. % (0Zn) in the glass ceramic material and the glass ceramic material comprises about 7.2 at. % of calcium, about 14.4 at. % aluminum, about 17.5 at. % of silicon, 0 at. % zinc, about 0.1 at. % europium, about 53.6 at. % oxygen, and about 7.2 at. % nitrogen, based on a total atom count of the glass ceramic material. In an embodiment, the zinc oxide has a weight percentage of about 3 wt. % in the glass ceramic material and the glass ceramic material comprises about 7.1 at. % of calcium, about 14.2 at. % aluminum, about 17.2 at. % of silicon, about 0.8 at. % zinc, about 0.1 at. % europium, about 53.6 at. % oxygen, and about 7.1 at. % nitrogen, based on a total atom count of the glass ceramic material. In an embodiment, the zinc oxide has a weight percentage of about 6 wt. % in the glass ceramic material and the glass ceramic material comprises about 7 at. % of calcium, about 13.9 at. % aluminum, about 16.9 at. % of silicon, about 1.6 at. % zinc, about 0.1 at. % europium, about 53.5 at. % oxygen, and about 7 at. % nitrogen, based on a total atom count of the glass ceramic material. In an embodiment, the zinc oxide has a weight percentage of about 9 wt. % in the glass ceramic material and the glass ceramic material comprises about 6.8 at. % of calcium, about 13.7 at. % aluminum, about 16.6 at. % of silicon, about 2.4 at. % zinc, about 0.1 at. % europium, about 53.5 at. % oxygen, and about 6.8 at. % nitrogen, based on a total atom count of the glass ceramic material. In an embodiment, the zinc oxide has a weight percentage of about 15 wt. % in the glass ceramic material and the glass ceramic material comprises about 6.6 at. % of calcium, about 13.2 at. % aluminum, about 16 at. % of silicon, about 4.1 at. % zinc, about 0.1 at. % europium, about 53.3 at. % oxygen, and about 6.6 at. % nitrogen, based on a total atom count of the glass ceramic material. In another embodiment, the zinc oxide has a weight percentage of about 15 wt. % and the carbon nanotubes have a weight percentage of about 15 wt. % in the glass ceramic material and the glass ceramic material comprises about 6.6 at. % of calcium, about 13.1 at. % aluminum, about 15.9 at. % of silicon, about 4.1 at. % zinc, about 0.11 at. % europium, about 0.6 at. % carbon, about 53 at. % oxygen, and about 6.6 at. % nitrogen, based on a total atom count of the glass ceramic material.

In some embodiments, the Al/(Al+Si) ratio in the glass-ceramic material is in the range of 0.2-1, preferably 0.25-0.9, preferably 0.3-0.8, preferably 0.35-0.7, preferably 0.4-0.6, more preferably 0.45-0.5, and yet more preferably about 0.45, and all ranges in between. In a preferred embodiment, the Al/(Al+Si) ratio in the glass-ceramic material is about 0.45.

Referring to FIG. 1, a flowchart of a method 100 of preparing the glass-ceramic material is described. The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, the method 100 includes heating a calcium oxide, an aluminum oxide, a silicon oxide, and a silicon nitride to a temperature of 1500 to 1700° C., preferably 1550 to 1690° C., more preferably 1600 to 1670° C., and yet more preferably about 1650° C., in an inert atmosphere to form a first mixture. Each of the calcium oxide, the aluminum oxide, the silicon oxide, and the silicon nitride have a purity of at least 99%, preferably at least 99.5%, and more preferably at least 99.9%. In some embodiments, the inert atmosphere may comprise helium, nitrogen, neon, argon, krypton, xenon, radon, and the like. In a preferred embodiment, the inert atmosphere is a nitrogen atmosphere.

At step 104, the method includes grinding the oxynitride glass and adding zinc oxide to form a mixture. In some embodiments, grinding may occur manually, mechanically, and/or by any methods known in the art.

At step 106, the method 100 includes sintering the mixture at a pressure of 15 to 25 MPa, preferably 16 to 24 MPa, preferably 17 to 23 MPa, preferably 18 to 22 MPa, more preferably 19 to 21 MPa, and yet more preferably about 20 MPa and to a temperature of 500 to 1000° C., preferably 600 to 975° C., preferably 700 to 950° C., preferably 800 to 925° C., more preferably 890 to 910° C., and yet more preferably about 900° C. at a heating rate of 50 to 200° C./minute, preferably 55 to 190° C./minute, preferably 60 to 180° C./minute, preferably 65 to 170° C./minute, preferably 70 to 160° C./minute, preferably 80 to 150° C./minute, preferably 85 to 140° C./minute, preferably 90 to 130° C./minute, preferably 93 to 120° C./minute, preferably 95 to 110° C./minute, more preferably 98 to 105° C./minute, and yet more preferably about 100° C./minute to form the glass-ceramic material. In some embodiments, the mixture is sintered by SPS. As used herein, "spark plasma sintering" (SPS), which is also known as "field assisted sintering technique" (FAST) or "pulsed electric current sintering" (PECS), is a sintering technique, in which the pulsed DC current directly passes through a graphite die, as well as the mixture, in case of conductive samples. Joule heating has been found to play a role in the densification of powder compacts, achieving near theoretical density at lower sintering temperatures than conventional sintering techniques. The heat generation is internal, in contrast to the conventional hot pressing, where external heating elements provide the heat. This facilitates a high heating or cooling rate, and the sintering process may be fast. The general speed of the process has the potential to densify powders/mixtures with nanosize or nanostructure while avoiding coarsening, which accompanies standard densification routes.

The mixture is fed directly into a graphite die without a pre-compaction step (e.g., by vibration or applying suitable pressure). The graphite die has a thickness of about 10-30 mm, preferably 15-25 mm, and more preferably about 20 mm. The die containing the mixture may be placed directly in an SPS chamber or furnace, and spacers may be used, if necessary. In some embodiments, a thin graphite foil, preferably a graphite film/sheet, is used as a spacer between the mixture and the die to facilitate sample ejection after sintering, to reduce the friction between the die walls and the mixture, and to prevent punch wear. In some embodiments, the graphite sheet has a thickness of 0.2-0.4 mm, preferably 0.22-0.38 mm, preferably 0.24-0.36 mm, preferably 0.26-0.34 mm, preferably 0.28-0.32 mm, and preferably about 0.3 mm. In a preferred embodiment, the graphite sheet has a thickness of about 0.35 mm. In some embodiments, the SPS chamber is closed, and the sintering is carried out in an inert atmosphere, preferably an argon atmosphere, with a partial vacuum at a pressure of no higher than 100 MPa being applied in the chamber, preferably 10-100 MPa, preferably 15-95 MPa, preferably 20-90 MPa, preferably 25-85 MPa, preferably 30-80 MPa, preferably 35-75 MPa, preferably 40-70 MPa, preferably 45-65 MPa, preferably 50-60 MPa, and preferably about 55 MPa. In a preferred embodiment, the sintering is carried out with a constant uniaxial pressure of about 20 MPa. In some embodiments, the SPS heating occur for 2-20 minutes, preferably 5-15 minutes, and more preferably about 10 minutes. At step 108, the method 100 includes polishing the glass-ceramic material. The glass ceramic material is further ground on a diamond disk to remove a graphite film used in the SPS.

The mixture may be contaminated with traces of graphite. This may be removed using SiC abrasives, preferably SiC papers of varying grit sizes from 120 to 1200, preferably 150 to 1100, preferably 200 to 1000, preferably 300 to 900, preferably 400 to 800, preferably 500 to 700, and preferably about 600. In some embodiments, the glass-ceramic material is further polished using a polishing cloth with a diamond paste solution down to about a 1 μm finish.

In an embodiment, the glass-ceramic material has one or more conductive channels having a length of 100 to 1000 μm, preferably 150 to 950 μm, preferably 200 to 900 μm, preferably 250 to 850 μm, preferably 300 to 700 μm, preferably 350 to 650 μm, preferably 400 to 600, preferably 450 to 500, and preferably about 500 μm and a width of 0.5 to 10 μm, preferably 1 to 9 μm, preferably 2 to 8 μm, preferably 3 to 7 μm, preferably 4 to 6 μm, and preferably about 5 μm. In some embodiments, the one or more conductive channels comprise voids having a length of 0.5 to 5 μm, preferably 1 to 4 μm, and preferably 2 to 3 μm and a width of 0.1 to 0.5 μm, preferably 0.2 to 0.4 μm, and preferably 0.25 to 0.3 μm. In some embodiments, the conductive channels form a conductivity path that is an electron transfer path. In some embodiments, one or more conductive channels have one or more distributary channels, and the one or more conductive channels form a conductive network. In some embodiments, the one or more conductive channels may be straight, curved, in the form of a wave, and any other form known in the art. In some embodiments, the one or more distributary channels may be straight, curved, in the form of a wave, and any other form known in the art. In some embodiments, the one or more distributary channels may connect the one more conductive channels. In some embodiments, the one or more distributary channels are conductive.

In some embodiments, the glass-ceramic material has a density of 2.75 to 2.95 g cm$^{-3}$, preferably 2.80 to 2.90 g cm$^{-3}$, and preferably about 2.85 g cm$^{-3}$. In some embodiments, the glass-ceramic material has a thermal expansion of 4.5 to 5.0 ppm μm$^{-1}$, preferably 4.6 to 4.9 ppm μm$^{-1}$, preferably 4.7 to 4.8 ppm μm$^{-1}$, and preferably about 4.6 ppm μm$^{-1}$. In some embodiments, the glass-ceramic material has a thermal conductivity of 1.5 to 1.75 W m$^{-1}$ K$^{-1}$, preferably 1.55 to 1.70 W m$^{-1}$ K$^{-1}$, and preferably 1.6 to 1.65 W m$^{-1}$ K$^{-1}$.

In some embodiments, the glass-ceramic material has 9 percent by weight zinc oxide and an activation energy of 0.6 to 0.8 eV, preferably 0.65 to 0.75 eV, more preferably 0.68 to 0.7 eV, and yet more preferably about 0.69 eV. In some embodiments, the glass-ceramic material has 15 percent by weight zinc oxide and an activation energy of 0.3 to 0.5 eV, preferably 0.35 to 0.45 eV, more preferably 0.41 to 0.43 eV, and yet more preferably about 0.42 eV. In some embodiments, the glass-ceramic material has a DC conductivity value of 0.1 to 0.3 S/cm, preferably 0.15 to 0.25 S/cm, more preferably 0.19 to 0.21 S/cm, and yet more preferably about 0.2 S/cm. In some embodiments, the glass-ceramic material has 9 percent by weight zinc oxide and a hopping energy of 0.2 to 0.3 eV, preferably 0.22 to 0.26 eV, more preferably 0.23 to 0.25 eV, and yet more preferably about 0.24 eV. In some embodiments, the glass-ceramic material has 9 percent by weight zinc oxide and a structural disorder energy between jump sites of 0.8 to 1.0 eV, preferably 0.85 to 0.95 eV, more preferably 0.89 to 0.91 eV, and yet more preferably about 0.9 eV. In some embodiments, wherein the glass-ceramic material has 15 percent by weight zinc oxide and a hopping energy of 0.1 to 0.2 eV, preferably 0.12 to 0.18 eV, more preferably 0.15 to 0.17 eV, and yet more preferably about 0.16 eV. In some embodiments, wherein the glass-ceramic material has 15 percent by weight zinc oxide and a structural disorder energy between jump sites of 0.4 to 0.6 eV, preferably 0.45 to 0.55 eV, more preferably 0.51 to 0.53 eV, and yet more preferably about 0.52 eV. In some embodiments, the glass-ceramic material is conductive from 200 to 550 K, preferably 250 to 500 K, preferably 300 to 450 K, and preferably 350 to 400 K.

The glass or the glass-ceramic material of the present disclosure may be used in smart devices, electronic devices, electrical appliances, home appliances, kitchen wares, and the like.

EXAMPLES

The following examples demonstrate a glass-ceramic material, as described herein. The examples are provided solely for illustration and are not to be construed as limitations of the present disclosure, as many variations are possible without departing from the spirit and scope of the present disclosure.

Example 1: Materials

The $Ca_7Al_{14}Si_{17}O_{52}N_7$ (at. %) based oxynitride glass was prepared using high-purity (99.9%) oxides of CaO, (Alfa Aesar GmbH & Co), $Al_2O_3$ (ChemPur GmbH), $SiO_2$ (ABCR GmbH & Co), and $Si_3N_4$ (99% ChemPur GmbH) as a source of nitrogen.

Example 2: Synthesis of Zinc Oxide Doped Calcium-Aluminosilicate Oxynitride Glass-Ceramics A precursor mixture was placed in an Nb crucible and heated in a nitrogen atmosphere up to the final temperature of 1650° C. The glass composition was obtained by electron microprobe analysis (EMPA) with a JEOL 8500F instrument operating at 12 kV and 30 nA. ZnO was added to the re-grinded glass matrix prior to the spark plasma sintering (SPS) (HP D5, FCT Systems, Frankenblick, Germany). 5 grams (g) of $Ca_7Al_{14}Si_{17}O_{52}N_7$ glass powder was mixed with 3, 6, 9, and 15 wt. % of ZnO. Additionally, 15 wt. % carbon nanotubes (CNT) were doped with 15 wt. % ZnO and 5 grams of $Ca_7Al_{14}Si_{17}O_{52}N_7$ glass powder. A trace amount (0.05 g) of $Eu_2O_3$ was also added to each sample as a nucleation agent. The details about the sintering process and sample IDs are listed in Table 1. The IDs of samples are correlated with the added wt. % of ZnO, respectively: 0Zn, 3Zn, 6Zn, 9Zn, 15Zn, 15ZnC.

A mixture of ZnO and $Ca_7Al_{14}Si_{17}O_{52}N_7$ powder was poured into a 20 mm graphite die. A constant uniaxial pressure of 20 MPa was applied at room temperature before sintering at 900° C. (just below the pristine glass transition temperature, 940° C.). The heating rate was 100° C./min, and the soaking time was 10 minutes. The sintering process was performed in a vacuum with an initial pressure of 5×10$^{-2}$ mbar [Irshad, H. M. et al., Effect of Ni content and $Al_2O_3$ particle size on the thermal and mechanical properties of $Al_2O_3$/Ni composites prepared by spark plasma sintering, *Int J Refract Hard Met.*, 2018, 76, 25-32; and Hakeem, A. S. et al., Synthesis and characterization of alkaline earth and rare earth doped sialon Ceramics by spark plasma sintering, *Int J Refract Hard Met.*, 2021, 97, which are incorporated herein by references in their entireties] Synthesized glass-ceramics disks, approximately 20 mm in diameter and 5 mm thick, were produced. Further synthesis and characterization details are given in references [Ali, S. et al., Issues associated with the development of transparent oxynitride glasses, *Ceram. Int.*, 2015, 41, 3345-3354; Ali, S. and Jonson, B., Glasses in the Ba—Si—O—N System, *J. Am. Ceram. Soc.*, 2011, 94, 2912-2917; Sharafat, A. and Bo, J., Compositional effects on the properties of high nitrogen content alkaline-earth silicon oxynitride glasses, AE=Mg, Ca, Sr, Ba, *J. Eur. Ceram. Soc.*, 2011, 31, 611-618; Sharafat, A. et al., Formation and properties of nitrogen-rich strontium silicon oxynitride glasses, *J. Mater. Sci.*, 2009, 44, 664-670; and Sharafat, A. et al., Glass-forming region in the Ca—Si—O—N system using $CaH_2$ as Ca source, *J. Eur. Ceram. Soc.*, 2008, 28, 2659-2664, which are incorporated herein by references in their entireties]. During the spark plasma sintering (SPS) process, a contamination layer formed on the sample surfaces due to the graphite sheet used. This layer was eliminated using SiC abrasive paper with grit sizes ranging from 120 to 1200. For microstructure analyses, a final polishing step was carried out using diamond polishing down to 1 μm finish. Unlike conventional sintering techniques, the SPS process generates heat by passing a high-pulsed direct current through a graphite die and the sample to be sintered.

Six glass-ceramic composites were synthesized using the spark plasma technique. Detailed compositional information is delineated in Table 1. The incorporation of ZnO and $Eu_2O_3$ was confirmed using SEM-EDX analysis. The ratios of Al/Si and Ca/(Al+Si) within each composition exhibit consistency, attaining values of 0.82 and 0.23, respectively. FIGS. 3A-3H and FIGS. 4A-4F show the morphology of the synthesized samples.

TABLE 1

Sample designation, wt. % of ZnO doped, and SPS synthesis temperature and pressure

| ID | ZnO doped (wt. %) | Synthesized temperature (° C.) | Pressure (MPa) |
|---|---|---|---|
| G | 0 | NA | NA |
| 0Zn | 0 | 900 | 20 |
| 3Zn | 3 | 900 | 20 |
| 6Zn | 6 | 900 | 20 |
| 9Zn | 9 | 900 | 20 |
| 15Zn | 15 | 600 | 18 |
| 15ZnC | 15 | 600 | 18 |

Example 3: Characterization Study Using X-Ray Diffraction (XRD) Spectroscopy

The physical properties, such as phase composition, crystal structure, and orientation of powder, solid, and liquid samples, were analyzed by XRD spectroscopy. The amorphous/crystalline nature of the pristine $Ca_7Al_{14}Si_{17}O_{52}N_7$ sample and glass-ceramics after melting and sintering with the SPS process, respectively, were verified by powder X-ray diffraction, using a Panalytical X'pert PRO MPD diffractometer and $Cu(K_\alpha)$ radiation ($\lambda$=154.1 μm). Microstructure observations were conducted using an optical microscope (DSX510, Olympus, Japan) and a scanning electron microscope (JSM-7000F, JEOL, Japan with Schottky-type FEG) equipped with an energy-dispersive X-ray spectrometer (EDS detector, Oxford Instruments, UK). The scanning electron microscope (SEM) was operated at acceleration voltages of 15 kV, and specimen images were captured in backscattered electron mode. The samples were analyzed using XRD (2°/min from 10 to 100°). Results of XRD and SEM analysis support that increasing the amount of Zn increases the crystallinity in the glass matrix.

Figure 2:
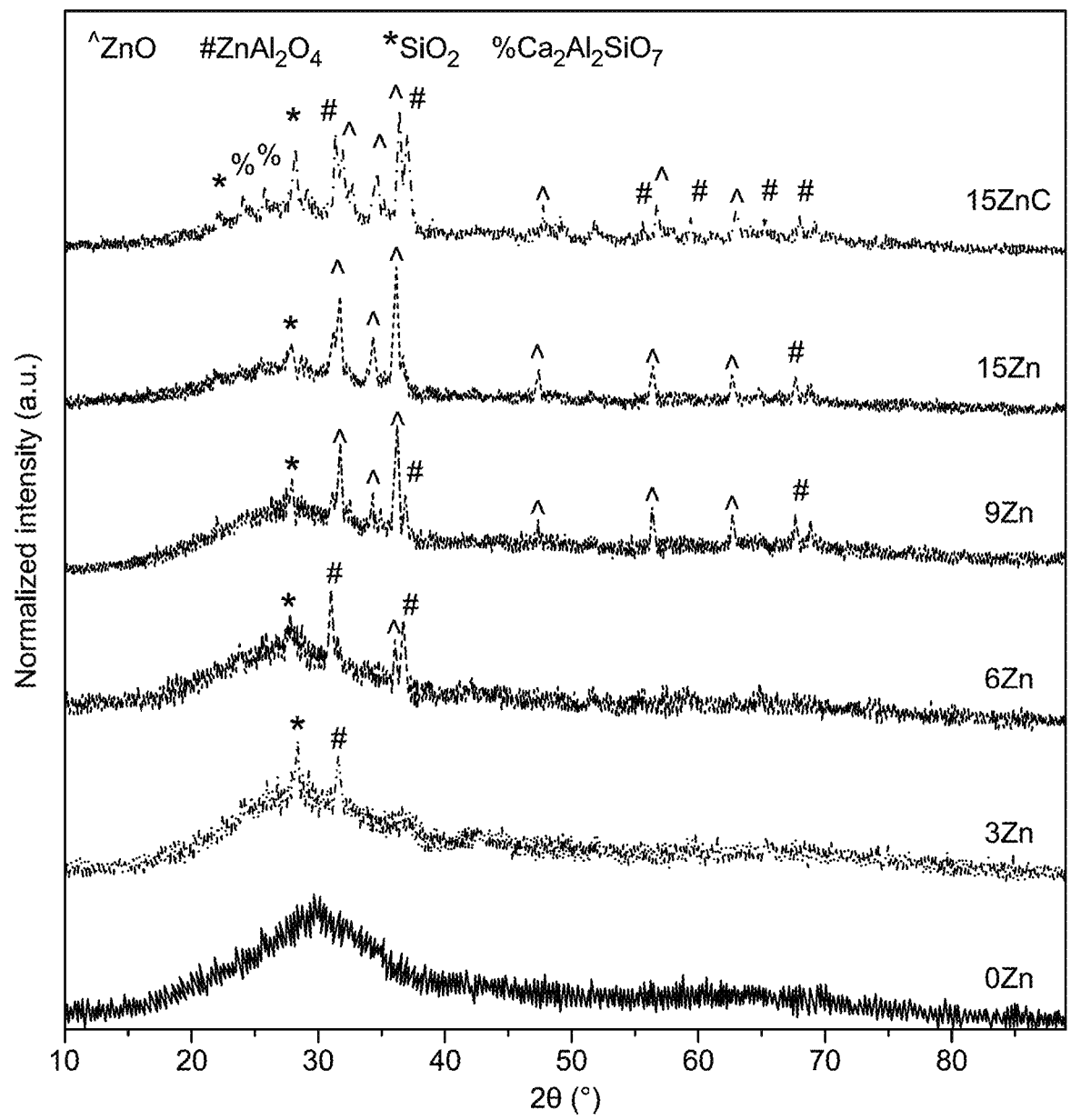
FIG. 2 depicts X-ray diffraction (XRD) patterns of glass (no Zn (0Zn)) and glass-ceramic materials (3Zn, 6Zn, 9Zn, 15Zn, and 15ZnC), according to certain embodiments.

The structure of the samples was examined using the XRD technique, and the obtained diffractograms after normalization are presented in FIG. 2. The initial oxynitride glass G, $Ca_7Al_{14}Si_{17}O_{52}N_7$ (not shown), and comparative sample 0Zn exhibit a characteristic amorphous halo observed in glasses. ZnO-doped samples 3Zn, 6Zn, 9Zn, 15Zn, and 15ZnC display amorphous halos and sharp reflections, indicating the presence of different crystalline phases. The intensities and widths of these reflections vary with the ZnO content in the glass matrix. ZnO is also observed as a separated crystal in XRD analysis.

Figure 3A:
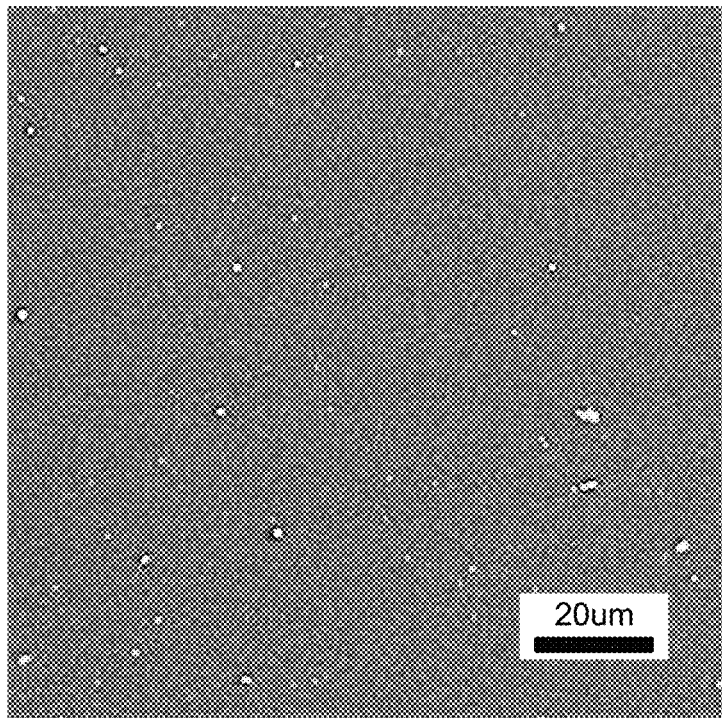
FIG. 3A depicts a field emission scanning electron microscopy (FESEM) image of 0Zn at a scale of 20 μm, according to certain embodiments.
Figure 3B:
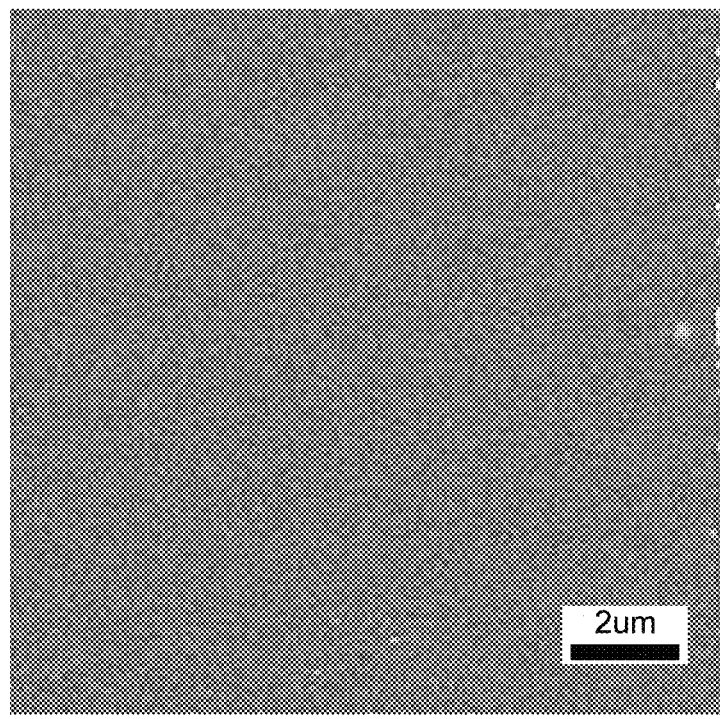
FIG. 3B depicts an FESEM image of 0Zn at a scale of 2 μm, according to certain embodiments.
Figure 3C:
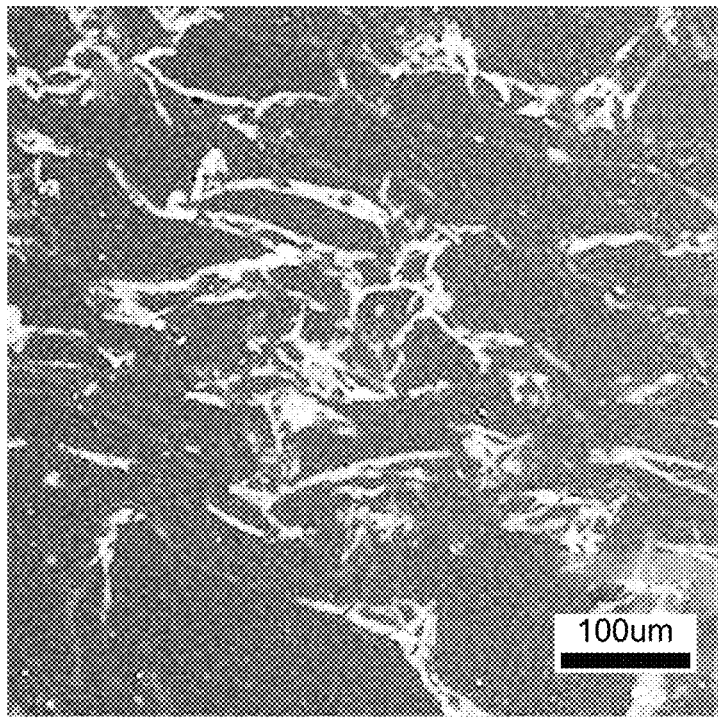
FIG. 3C depicts an FESEM image of 3Zn at a scale of 100 μm, according to certain embodiments.
Figure 3D:
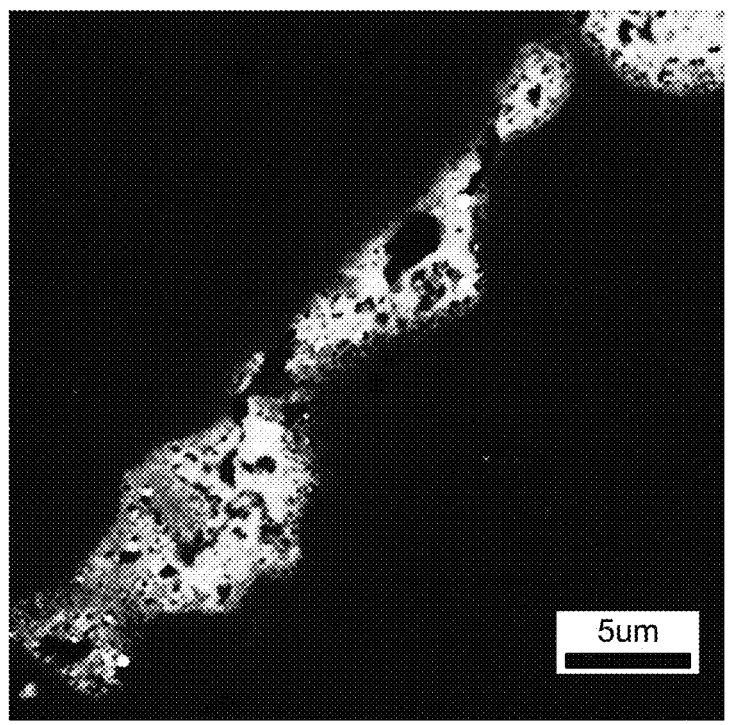
FIG. 3D depicts an FESEM image of 3Zn at a scale of 5 μm, according to certain embodiments.
Figure 3E:
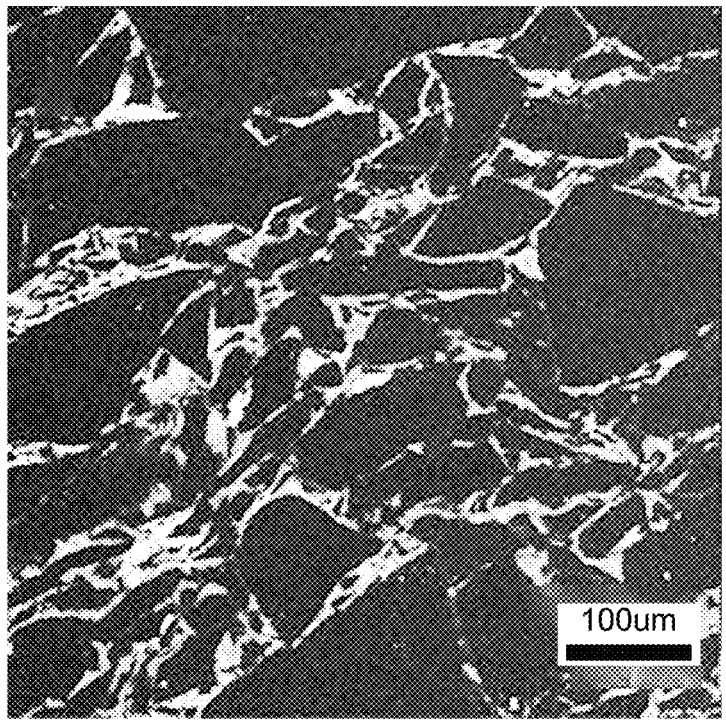
FIG. 3E depicts an FESEM image of 6Zn at a scale of 100 μm, according to certain embodiments.
Figure 3F:
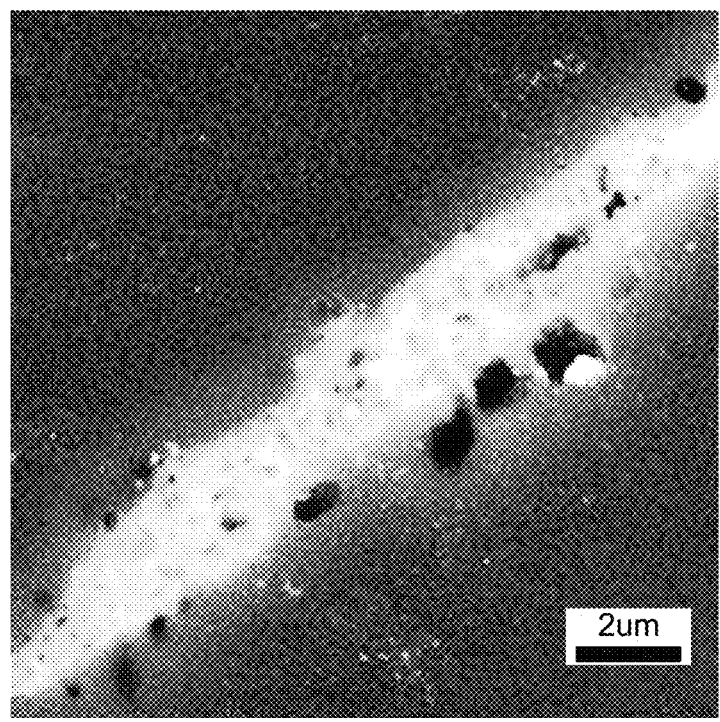
FIG. 3F depicts an FESEM image of 6Zn at a scale of 2 μm, according to certain embodiments.
Figure 3G:
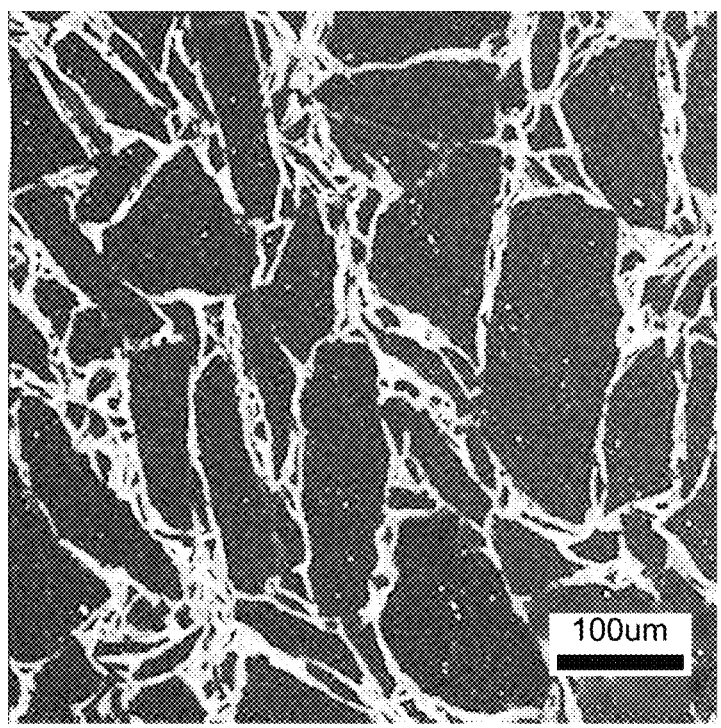
FIG. 3G depicts an FESEM image of 9Zn at a scale of 100 μm, according to certain embodiments.
Figure 3H:
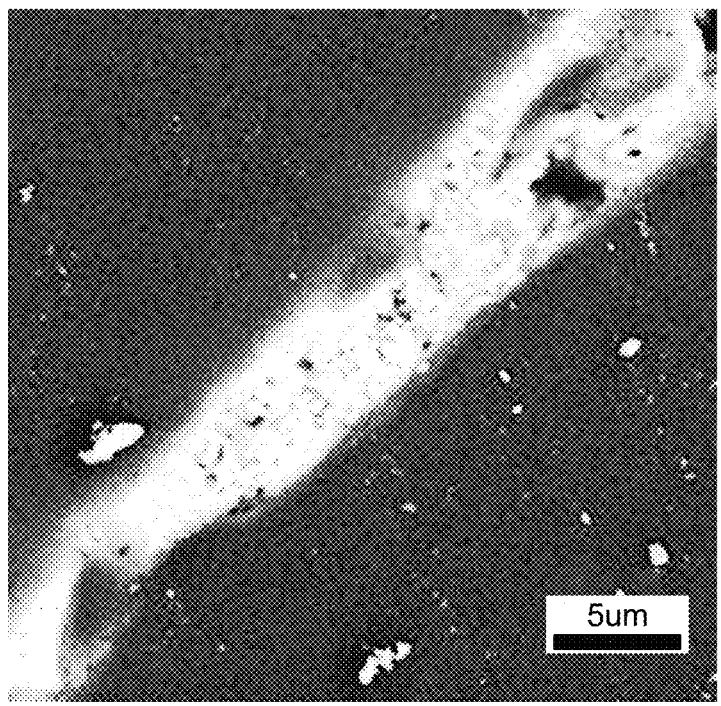
FIG. 3H depicts an FESEM image of 9Zn at a scale of 5 μm, according to certain embodiments.

Microstructure observations are depicted in FIG. 3A and FIG. 3B. The FESEM images of the 0Zn sample show a homogeneous topography of glass (FIG. 3A and FIG. 3B). Even a marginal addition of ZnO causes an alteration in the topography of the samples. Samples doped with ZnO exhibit inhomogeneities with elongated and narrow shapes, resembling paths. In the 3Zn sample, the apparent inhomogeneities accumulated in the form of paths are discontinuous and short (FIG. 3C). Upon closer examination, it is observed that the inhomogeneities lack a pronounced longitudinal orientation (FIG. 3D). A higher ZnO content causes an increase in the amount of inhomogeneities observed in both the 6Zn (FIG. 3E) and 9Zn (FIG. 3G) samples, which begin to form longer and more continuous paths. The continuity and longitudinality of the tracks are also visible at higher magnification for both samples (FIG. 3F and FIG. 3H for 6Zn and 9Zn, respectively).

Figure 4A:
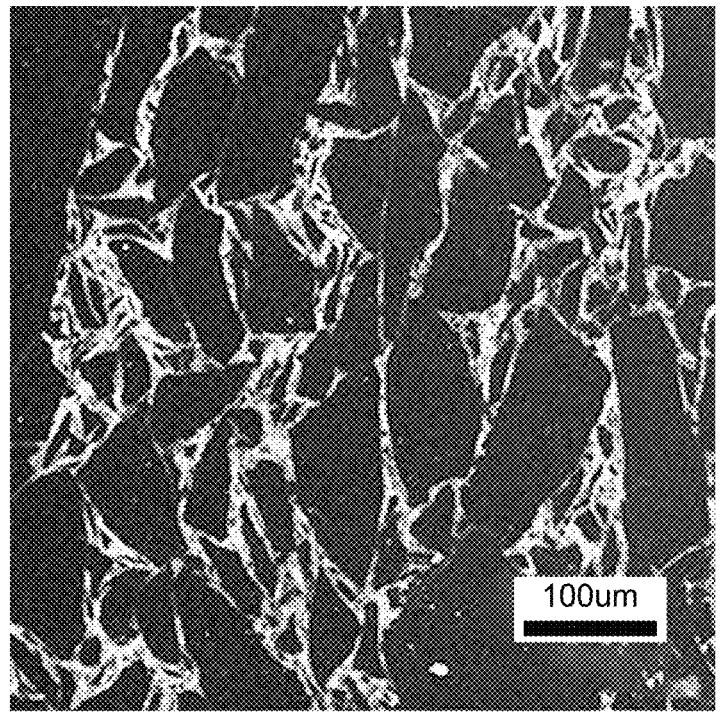
FIG. 4A depicts an FESEM image of 15Zn at a scale of 100 μm, according to certain embodiments.
Figure 4B:
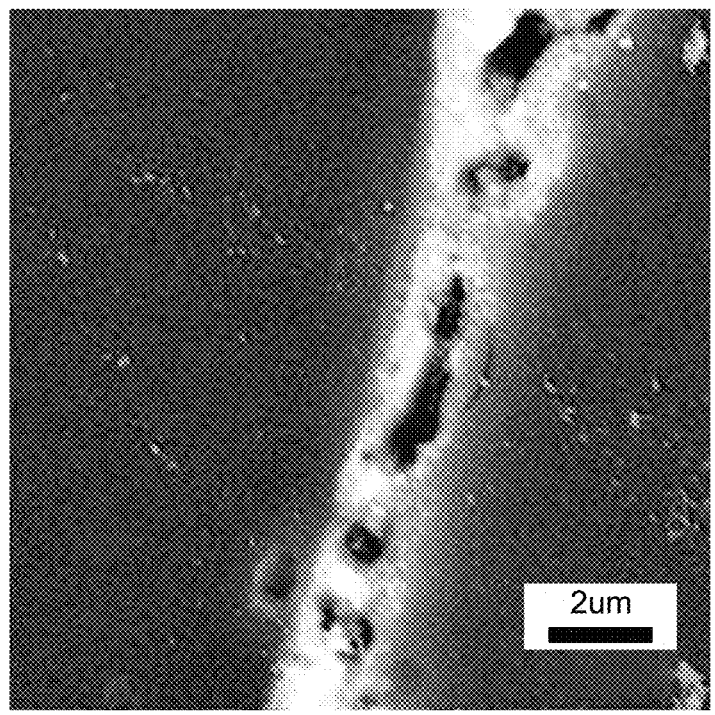
FIG. 4B depicts an FESEM image of 15Zn at a scale of 2 μm, according to certain embodiments.
Figure 4C:
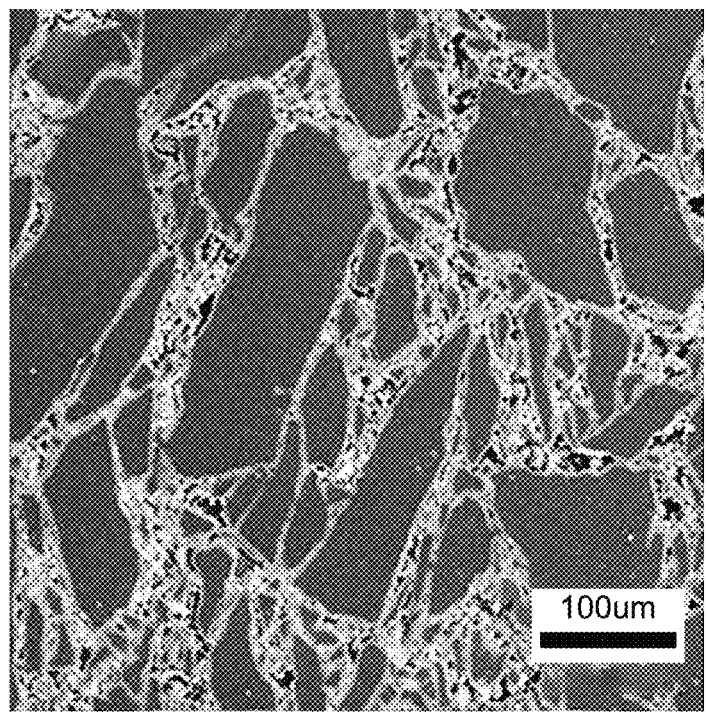
FIG. 4C depicts an FESEM image of 15ZnC at a scale of 100 μm, according to certain embodiments.
Figure 4D:
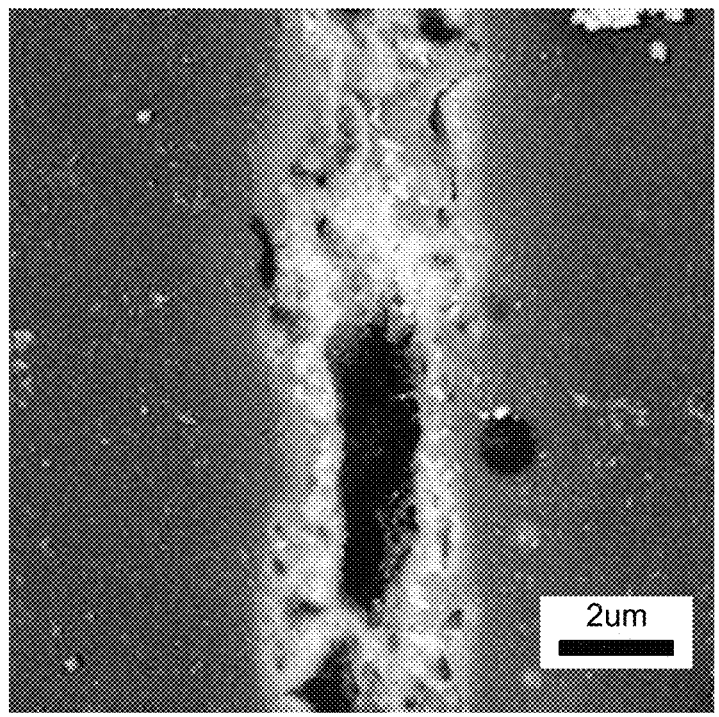
FIG. 4D depicts an FESEM image of 15ZnC at a scale of 2 μm, according to certain embodiments.
Figure 4E:
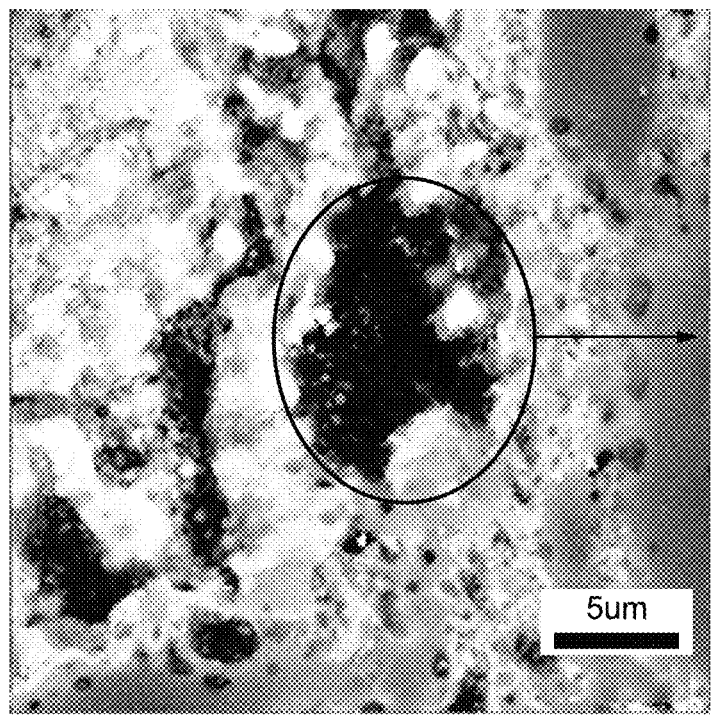
FIG. 4E depicts an FESEM image of 15ZnC at a scale of 5 μm, according to certain embodiments.
Figure 4F:
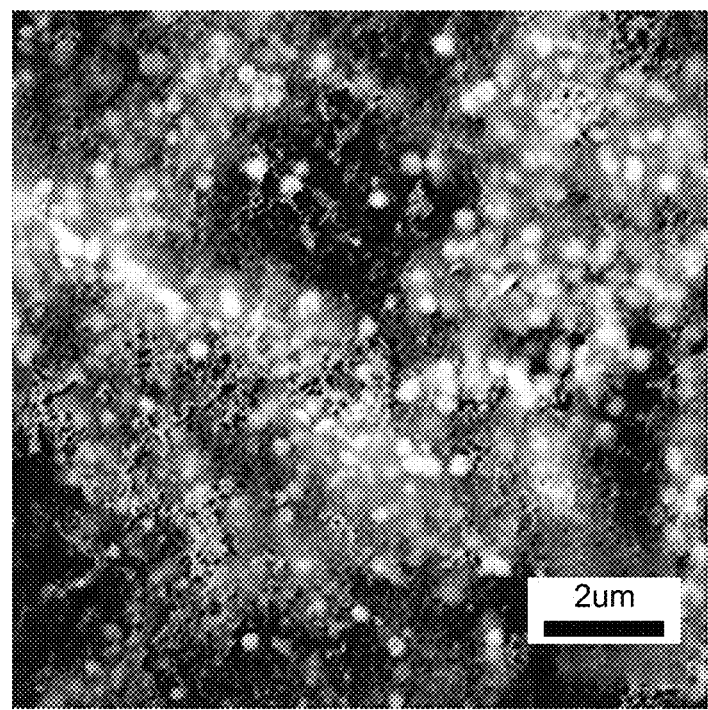
FIG. 4F depicts an FESEM image of 15ZnC at a scale of 2 μm, according to certain embodiments.

Upon doping with a higher amount of ZnO, no large differences in topography are visible for the 15Zn sample (FIGS. 4A and 4B) compared to the 9Zn sample; however, the simultaneous addition of carbon nanotubes and ZnO does affects the topography of the 15ZnC sample (FIGS. 4C-4F). In addition to a visible increase in the number of longitudinal inhomogeneities, thickening of the longitudinal inhomogeneities is also observed. Additionally, darker clusters derived from carbon nanotubes are visible (FIGS. 4E and 4F). Energy dispersive X-ray (EDX) microanalysis is a technique of elemental analysis associated with electron microscopy based on the generation of characteristic X-rays that reveal the presence of elements in the specimens [Scimeca, M. et al., Energy Dispersive X-ray (EDX) microanalysis: A powerful tool in biomedical research and diagnosis, *Eur. J. Histochem.*, 2018, 62, 1, 2841, which is incorporated herein by reference in its entirety]. EDX analysis showed that the visible paths are well-conductive and are composed mostly of Zn and Eu. The remaining matrix surrounding the visible paths is a good dielectric consisting mainly of Si, Al, and Ca. O, N, and Eu are uniformly distributed throughout the sample.

Based on the FESEM-EDX images, the phases that best matched the visible reflections were determined. For the 3Zn sample, two low-intensity reflections were associated with crystalline phases: $SiO_2$ (reference code: 01-079-1914, ICSD collection code: 067125) and $ZnAl_2O_4$ [Hazen, R. M. et al., High-pressure crystal chemistry and amorphization of α-quartz, *Solid State Communications,* 1989, 72, 507-511, which is incorporated herein by reference in its entirety] (reference code: 01-074-1138, ICSD collection code: 026856). For the 6Zn sample, an additional reflection related to ZnO (reference code: 01-079-0208, ICSD collection code: 065122) appears, but the $ZnAl_2O_4$ phase still dominates [Albertsson, J. et al., Atomic displacement, anharmonic thermal vibration, expansivity and pyroelectric coefficient thermal dependences in ZnO, *Acta Crystallographica Section B,* 1989, 45, 34-40, which is incorporated herein by reference in its entirety]. For higher ZnO dopant contents, the ZnO crystalline phase begins to dominate. The addition of carbon nanotubes changes the structure of the 15ZnC sample, in which a new crystal phase $Ca_2Al_2SiO_7$ (reference code: 01-074-1607, ICSD collection code: 027427) [Korczak, P. and Raaz, F., *Anz. Oesterr. Akad. Wiss., Math.-Naturwiss. Kl.,* 1967, 104, 383, which is incorporated herein by reference in its entirety] was observed. Additionally, a higher content of the $ZnAl_2O_4$ phase can be noticed.

Example 4: Infrared Spectroscopy of Glass and Ceramic Glasses

Structure measurements using infrared (IR) spectroscopy were conducted utilizing a Frontier FTIR spectrometer from PerkinElmer. Samples for analysis were prepared by milling and compressing a mixture of the sample and KBr powders. The spectra were collected within the 400-4000 $cm^{-1}$ range, with a resolution of 4 $cm^{-1}$, averaging 64 scans. To facilitate a more accurate qualitative comparison, the displayed spectra were normalized to their maximum range in the mid-infrared region and underwent background correction. The estimated error in the infrared band position is ±2 $cm^{-1}$.

In the case of silicate glasses, the addition of aluminum is a glass-forming ingredient, not as a glass-modifying ingredient. This is true when the aluminum content is close to the silica content, as observed in the synthesized samples (Al/(Al+Si) ratio≈0.45). Additionally, aluminum and silicon have comparable masses and ionic ratios, which facilitates their vibrational coupling, which can be observed in IR spectra [Hwa, L.-G. et al., Infrared and Raman spectra of calcium alumino-silicate glasses, *J. Non-Cryst. Solids.*, 1998, 238, 193-197; and Okuno, M. et al., Structure of $SiO_2$—$Al_2O_3$ glasses: Combined X-ray diffraction, IR and Raman studies, *J. Non-Cryst. Solids.*, 2005, 351, 1032-1038, which are incorporated herein by references in their entireties]. The Al/Si ratio is similar throughout the glass-ceramic samples; therefore, the changes observed in the structure are correlated with the ZnO addition and lower Al+Si content. The effect of ZnO content on the structural properties of $Al_2O_3$—$SiO_2$ glass is observable because ZnO can act as a network modifier or network-forming agent, depending on its concentration. The introduction of $Zn^{2+}$ cations into the glass may cause the breakage of bridge bonds, which may lead to the formation of non-bridging oxygens (NBO).

Figure 5:
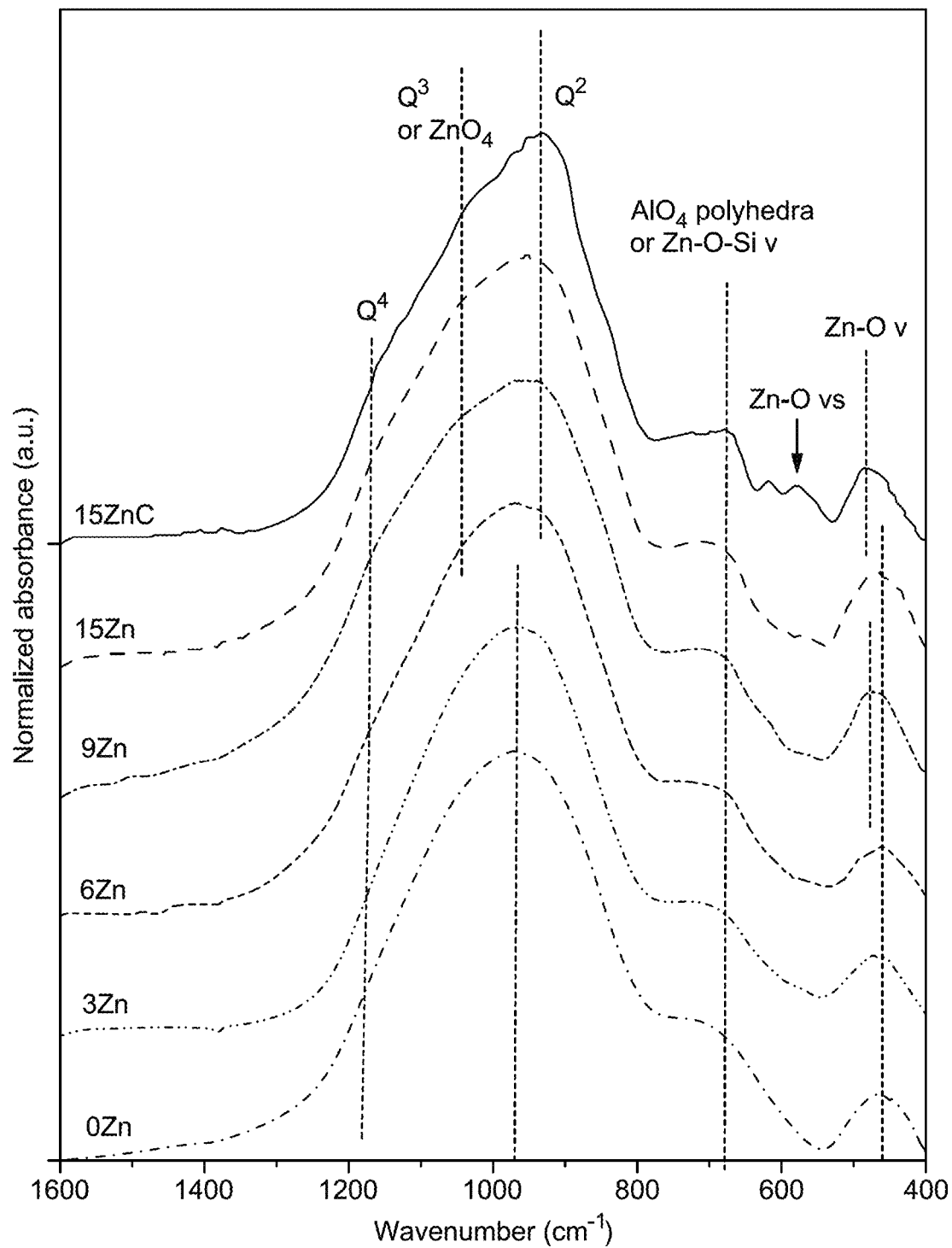
FIG. 5 depicts infrared (IR) spectra of 0Zn, 3Zn, 6Zn, 9Zn, 15Zn, and 15ZnC, according to certain embodiments.
Figure 6A:
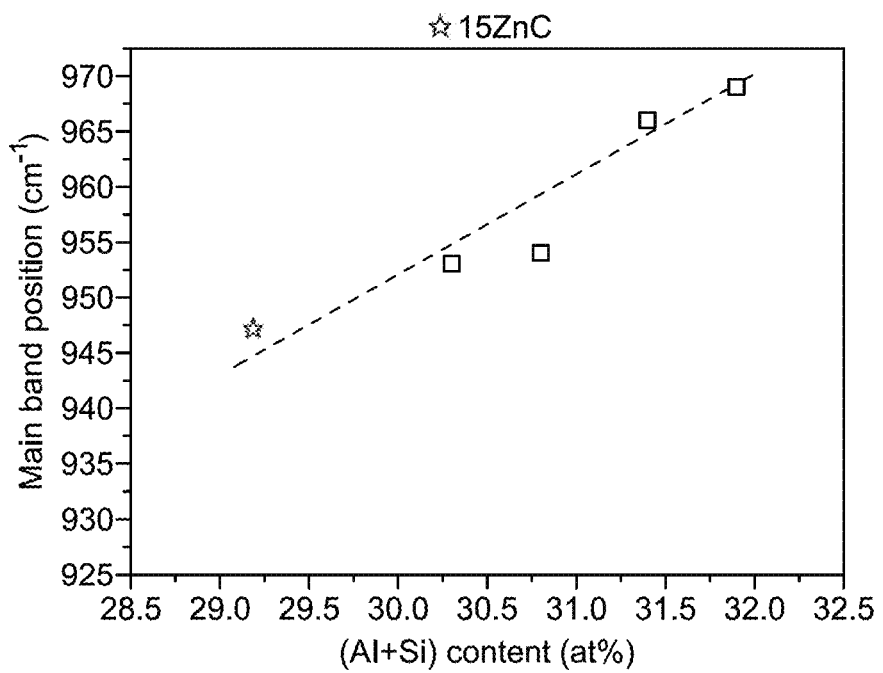
FIG. 6A depicts an IR main band position against Al+Si content for 0Zn, 3Zn, 6Zn, 9Zn, 15Zn, and 15ZnC, according to certain embodiments.

FIG. 5 depicts IR spectra of the glass-ceramic materials. The materials exhibit rounded curves, characteristic of amorphous materials. In 0Zn, the dominant asymmetric band appears at 969 $cm^{-1}$ with a shoulder at 1150 $cm^{-1}$. The strongest high-frequency band and its envelope are attributed to Si—O band vibrations in $Q^2$ units (silicate tetrahedra with two non-bridging oxygen) and the $Q^4$ units, respectively [Ali, S. et al., A novel approach for processing CaAlSiON glass-ceramics by spark plasma sintering: Mechanical and electrical properties, *J. Eur. Ceram. Soc.*, 2022, 42, 96-104; and Kamitsos, E. I. et al., Vibrational study of the role of trivalent ions in sodium trisilicate glass, *J. Non-Cryst. Solids.*, 1994, 171, 31-45, which are incorporated herein by references in their entireties]. The next distinct band appears at 692 $cm^{-1}$ and can be correlated with the network-substituted $AlO_4$ polyhedra including "condensed" alumina octahedra or "isolated" alumina tetrahedra within the network of calcium aluminosilicate glass [Hwa, L.-G. et al., Infrared and Raman spectra of calcium aluminosilicate glasses, *J. Non-Cryst. Solids.*, 1998, 238, 193-197; Okuno, M. et al., Combined X-ray diffraction, IR and Raman studies, *J. Non-Cryst. Solids.*, 2005, 351, 1032-1038; and Kamitsos, E. I. et al., Vibrational study of the role of trivalent ions in sodium trisilicate glass, *J. Non-Cryst. Solids.*, 1994, 171, 31-45, which are incorporated herein by references in their entireties]. The last visible band at 462 $cm^{-1}$ may be associated with the bending modes of bridging oxygen (BO) in the Si—O—Si and O—Si—O glass [Fondeur, F. and Mitchell, B. S., Infrared studies of preparation effects in calcium aluminate glasses, *Journal of Non-Crystalline Solids*, 1998, 224, 184-190; and Videau, J. J. et al., Structural approach of sialon glasses: M-Si—Al—O—N, *J. Eur. Ceram. Soc.*, 1997, 17, 1955-1961, which are incorporated herein by references in their entireties]. The high-frequency band shifts towards lower frequencies as the ZnO content increases and the total Si and Al content decreases, compared to that observed in the 0Zn reference sample (FIG. 6A). In the 15ZnC sample containing CNT, in which the Si+Al content is slightly lower than in the 15Zn sample, the positions of the dominant band and the band at 930 $cm^{-1}$ are the most shifted in the spectra. This phenomenon is attributed to the gradual change in the Si—O stretching frequency or the superposition of discrete bands arising from the $Si(OAl)_x$ unit, where x is the number of aluminate tetrahedra adjacent to the silicate tetrahedron [Fondeur, F. and Mitchell, B. S., Infrared studies of preparation effects in calcium aluminate glasses, *Journal of Non-Crystalline Solids*, 1998, 224, 184-190; and Videau, J. J. et al., Structural approach of sialon glasses: M-Si—Al—O—N, *J. Eur. Ceram. Soc.*, 1997, 17, 1955-1961, which are incorporated herein by references in their entireties]. Due to the consistent Al/Si ratio in the materials, the first situation of the gradual change in the Si—O stretching frequency may be more likely. The shift of the main band to lower frequencies may be attributed to the progressive depolymerization of the silicate-aluminate network as a consequence of the Zn content increase. A new shoulder appears near 1037 $cm^{-1}$ with the gradual addition of at least 6 wt. % ZnO, which suggests the presence of $Q^3$ units (silicate tetrahedra with one non-bridging oxygen) and an increase in the polymerization of glass network; however, the bands within the region of 800-1200 $cm^{-1}$ may be also attributed to $ZnO_4$ stretching vibrations [Rashid, S. S. A. et al., Comprehensive study on effect of sintering temperature on the physical, structural and optical properties of Er3+ doped ZnO-GSLS glasses, *Results in Physics*, 2017, 7, 2224-2231, which is incorporated herein by reference in its entirety]. A band at ~670 $cm^{-1}$ in samples with a higher ZnO content may also be correlated with the Zn—O—Si bending vibrations [Zaid, M. H. M. et al., Comprehensive study on compositional dependence of optical band gap in zinc soda lime silica glass system for optoelectronic applications, *Journal of Non-Crystalline Solids*, 2016, 449, 107-112; and Khalil, E. M. A. et al., Infrared absorption spectra of transition metals-doped soda lime silica glasses, Physica B: Condensed Matter, 2010, 405, 1294-1300, which are incorporated herein by references in their entireties] and the bands within the range of 400-460 $cm^{-1}$ may also correspond to the Zn—O stretching vibrational bond in $ZnO_4$ tetrahedral structures [Effendy, N. et al., Characterization and optical properties of erbium oxide doped ZnO SLS glass for potential optical and optoelectronic materials, *Materials Express*, 2017, 7, 59-65; Cui, H. et al., Nanoparticle Synthesis of Willemite Doped with Cobalt Ions ($Co_{0.05}Zn_{1.95}SiO_4$) by an Epoxide-Assisted Sol-Gel Method, Chemistry of Materials, 2005, 17, 5562-5566, which are incorporated herein by references in their entireties]. In 15ZnC, the small bands around 580-600 $cm^{-1}$ may be due to Zn—O symmetric stretching vibration [Zaid, M. H. M. et al., *Synthesis and characterization of low cost willemite based glass-ceramic for opto-electronic applications*, Journal of Materials Science: Materials in Electronics, 2016, 27, 11158-11167, which is incorporated herein by reference in its entirety]. Simultaneous changes in the relative intensity of the mentioned bands with increasing ZnO content for 9Zn, 15Zn, and 15ZnC indicate their relationship.

Example 5: Density, Thermal Conductivity, and Thermal Expansion of Glass and Glass Ceramics Densities were measured using Archimedes method on the glass and glass ceramics using water at 22° C. with ρ ($H_2O$)=0.998 $g/cm^3$. Thermal conductivity was assessed using a thermal conductivity analyzer (C-THERM-TCi, Canada). The thermal conductivity of the specimens was measured at room temperature by applying transient but constant heat to the sample via a one-sided interfacial heat reflector sensor. To investigate thermal expansion, the Mettler Toledo instrument (TMA/SDTA-LF/1100) was employed to measure the coefficients of expansion of the synthesised samples at room temperature in the air environment. Smooth-surfaced samples were cut into cubes approximately 4×4×4 mm in size for the thermal expansion measurements.

Figure 6B:
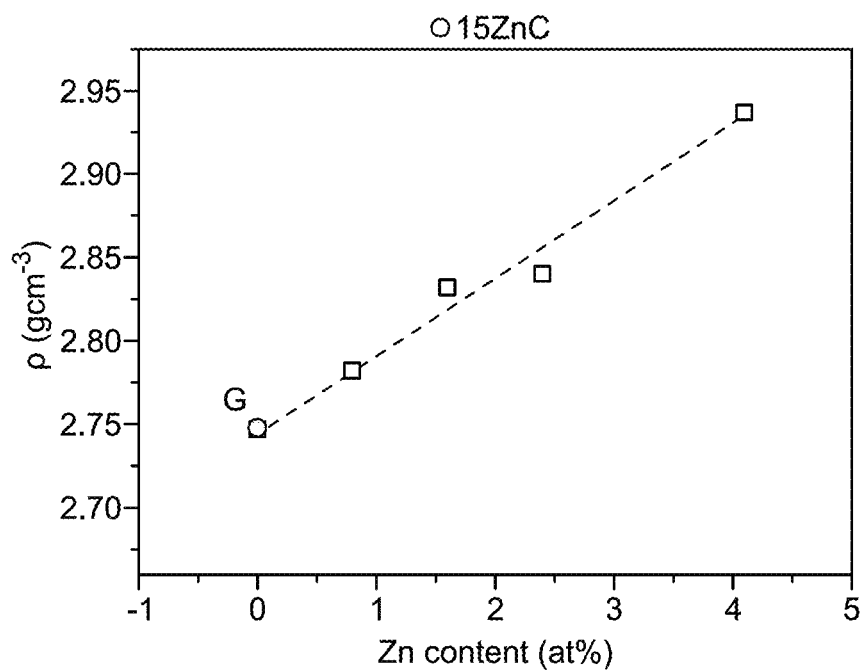
FIG. 6B depicts density dependence on Zn content for 0Zn, 3Zn, 6Zn, 9Zn, 15Zn, and 15ZnC, according to certain embodiments.

Measured densities for the pristine glass and glass-ceramics are given in Table 2. As shown in FIG. 6B, the density values vary between 2.75 and 2.93 g/cm$^3$ and increase with increasing Zn content. The increase in density with the increase in Zn content may be attributed to the large atomic weight of the Zn atom. The data also show that pristine glass, doped with Zn and carbon nanotubes (CNT) (15ZnC) exhibits a low density that may be correlated with the low density of carbon nanotubes. Thermal conductivity, varying between 1.52 and 1.72 W·m$^{-1}$·K$^{-1}$, depends on the ZnO content (see Table 2). Thermal conductivity of materials is influenced by both their micro- and macrostructure. Crystals with long-range order generally exhibit higher thermal conductivity compared to their amorphous counterparts [Kittel, C., Interpretation of the Thermal Conductivity of Glasses, *Physical Review*, 1949, 75, 972-974; and Pertermann, M. et al., Transport properties of low-sanidine single-crystals, glasses and melts at high temperature, *Contributions to Mineralogy and Petrology*, 2008, 155, 689-702, which are incorporated herein by references in their entireties]. Long-range order facilitates propagation of vibrational modes. Thermal conductivity of glass decreases when the network structure is depolymerized. This decrease depends on both the types of network-forming cations (Si, B, Al) and modifying cations (alkali and alkaline earth metals) [Hiroshima, Y. et al., Thermal conductivity of mixed alkali silicate glasses at low temperature, *J. Non-Cryst. Solids.*, 2008, 354, 341-344; Kim, Y. et al., The effect of borate and silicate structure on thermal conductivity in the molten Na$_2$O—B$_2$O$_3$—SiO$_2$ system, *J. Non-Cryst. Solids.*, 2015, 415, 1-8; and Kim, Y. and Morita, K., Temperature dependence and cation effects in the thermal conductivity of glassy and molten alkali borates, *J Non Cryst Solids.*, 2017, 471, 187-194, which are incorporated herein by references in their entireties]. In crystalline materials, grain boundaries lower macro-scale thermal conductivity due to phonon-phonon scattering [Sood, A. et al., Direct Visualization of Thermal Conductivity Suppression Due to Enhanced Phonon Scattering Near Individual Grain Boundaries, *Nano Letters*, 2018, 18, 3466-3472, which is incorporated herein by reference in its entirety]. Molecular dynamic simulations have indicated thermal conductivity of silica glass increases with a higher fraction of incorporated crystalline nano-threads and nano-plates [Kim, H. et al., Theoretical study of the thermal conductivity of silica glass-crystal composites, *J. Am. Ceram. Soc.*, 2023, 106, 977-987, which is incorporated herein by reference in its entireties]. Similarly, incorporating crystalline MnO$_2$ and Fe$_2$O$_3$ into cathode ray tube glass through powder sintering enhances thermal conductivity compared to melt-quenched counterparts with similar compositions [Østergaard, M. B. et al., Influence of foaming agents on solid thermal conductivity of foam glasses prepared from CRT panel glass, *J. Non-Cryst. Solids.*, 2017, 465, 59-64, which is incorporated herein by reference in its entirety]. Thermal expansion values (a) are given in Table 2, ranging between 6.4 and 4.5 ppm/μm, and decreasing with increasing the ZnO content in the glass-ceramics. The 15ZnC sample doped with carbon nanotubes has also the lowest thermal expansion coefficient of 4.5 ppm/μm. Thermal expansion values of glass-ceramic materials are influenced by the presence of voids and the breaking of bonds between constituents of the composite [Irshad, H. M. et al., Effect of Ni content and Al$_2$O$_3$ particle size on the thermal and mechanical properties of Al$_2$O$_3$/Ni composites prepared by spark plasma sintering, *Int J Refract Hard Met.*, 2018, 76, 25-32, which is incorporated herein by reference in its entirety]. Glass-ceramics have lower thermal expansion value than ordinary glasses [Lunkenheimer, P. et al., *Thermal expansion and the glass transition*, *Nature Physics*, 2023, 19, 694-699, which is incorporated herein by reference in its entirety], due to the crystallization process reducing the amorphous (non-crystalline) content in the material, leading to a more stable and less expansive structure.

TABLE 2

Details about sample composition, density (ρ), thermal expansion (α), and thermal conductivity (k) measured at room temperature

| ID | Composition (at. %) | ρ (g/cm$^3$) | α (ppm/ μm) | k (W/ m$^1$·K$^1$) |
|---|---|---|---|---|
| G | Ca$_7$Al$_{14}$Si$_{17}$O$_{52}$N$_7$ | 2.748 | 6.4 | NA |
| 0Zn | Ca$_{7.2}$Al$_{14.4}$Si$_{17.5}$Eu$_{0.1}$O$_{53.6}$N$_{7.2}$ | 2.747 | 5.2 | 1.52 |
| 3Zn | Ca$_{7.1}$Al$_{14.2}$Si$_{17.2}$Zn$_{0.8}$Eu$_{0.1}$O$_{53.6}$N$_{7.1}$ | 2.782 | 4.9 | 1.52 |
| 6Zn | Ca$_7$Al$_{13.9}$Si$_{16.9}$Zn$_{1.6}$Eu$_{0.1}$O$_{53.5}$N$_7$ | 2.832 | 4.8 | 1.54 |
| 9Zn | Ca$_{6.8}$Al$_{13.7}$Si$_{16.6}$Zn$_{2.4}$Eu$_{0.1}$O$_{53.5}$N$_{6.8}$ | 2.840 | 4.8 | 1.54 |
| 15Zn | Ca$_{6.6}$Al$_{13.2}$Si$_{16}$Zn$_{4.1}$Eu$_{0.1}$O$_{53.3}$N$_{6.6}$ | 2.937 | 4.6 | 1.72 |
| 15ZnC | Ca$_{6.6}$Al$_{13.1}$Si$_{15.9}$Zn$_{4.1}$Eu$_{0.11}$C$_{0.6}$O$_{53}$N$_{6.6}$ | 2.682 | 4.5 | NA |

Example 6: Electrical Behavior of Glass and Glass Ceramics

The electrical properties of samples were studied by the impedance spectroscopy method. Complex impedance measurements were performed using a Novocontrol Concept 40 broadband dielectric spectrometer Alpha-A, equipped with ZG4 dielectric interface in a frequency range from 10 mHz to 1 MHz and over a temperature range of 153 K to 623 K. A 1 Vrms AC voltage was applied in constant voltage mode. The temperature was incremented in steps of 10 K. Low-temperature measurements (153-473 K) were conducted in a nitrogen atmosphere using Quatro Cryosystem temperature-controlling system, while high-temperature measurements (373-623 K) were carried out in an air atmosphere using a high-temperature Novotherm HT 1600. The measurements involved multiple heating and cooling cycles in both the low- and high-temperature ranges. Gold electrodes were deposited via vacuum evaporation onto the polished, parallel surfaces of circular samples for electrical measurements.

Figure 7:
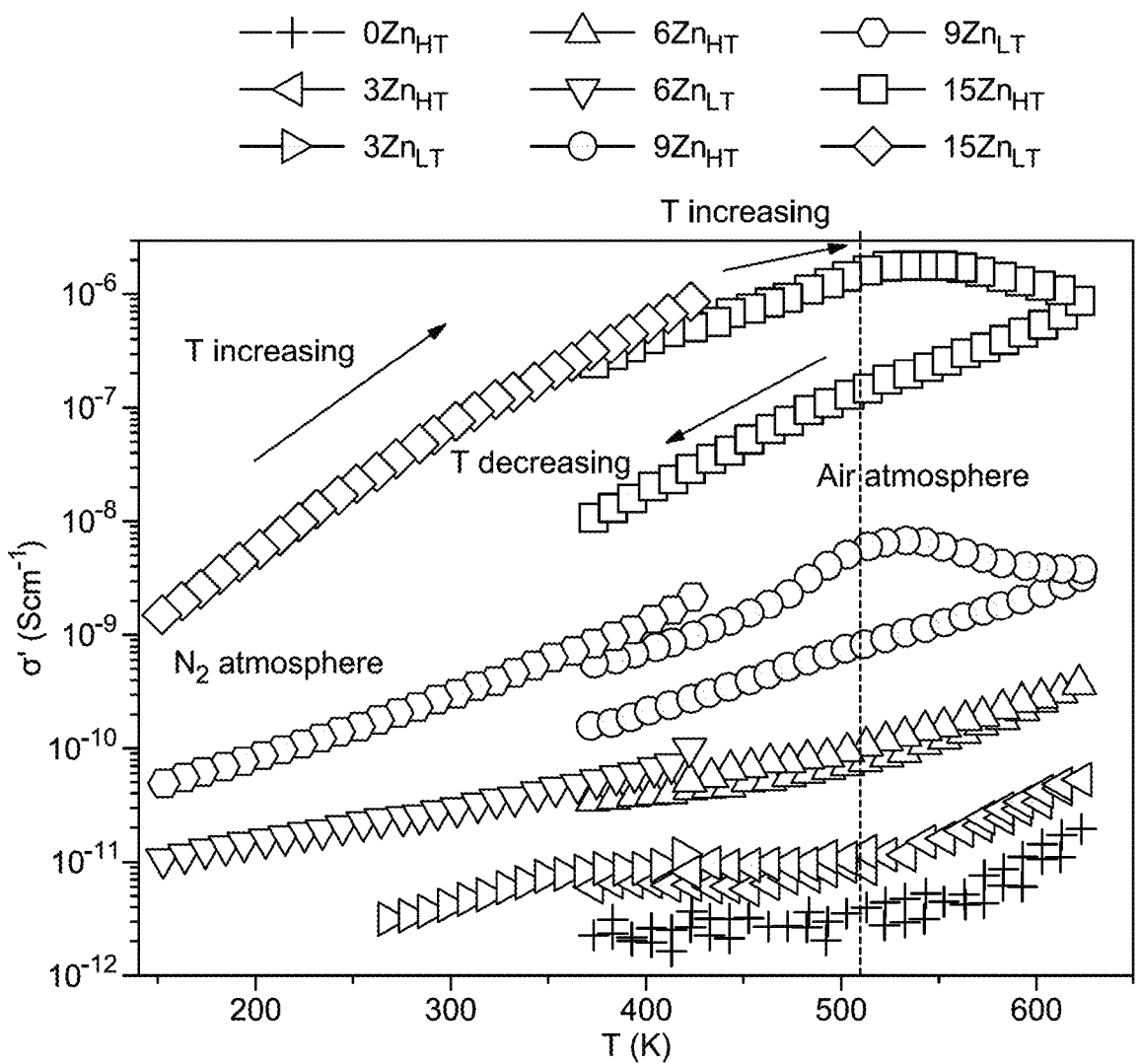
FIG. 7 depicts AC conductivity versus temperature for 0Zn, 3Zn, 6Zn, 9Zn, 15Zn, and 15ZnC measured at 100 Hz at low- and high-temperature ranges, according to certain embodiments.
Figure 8A:
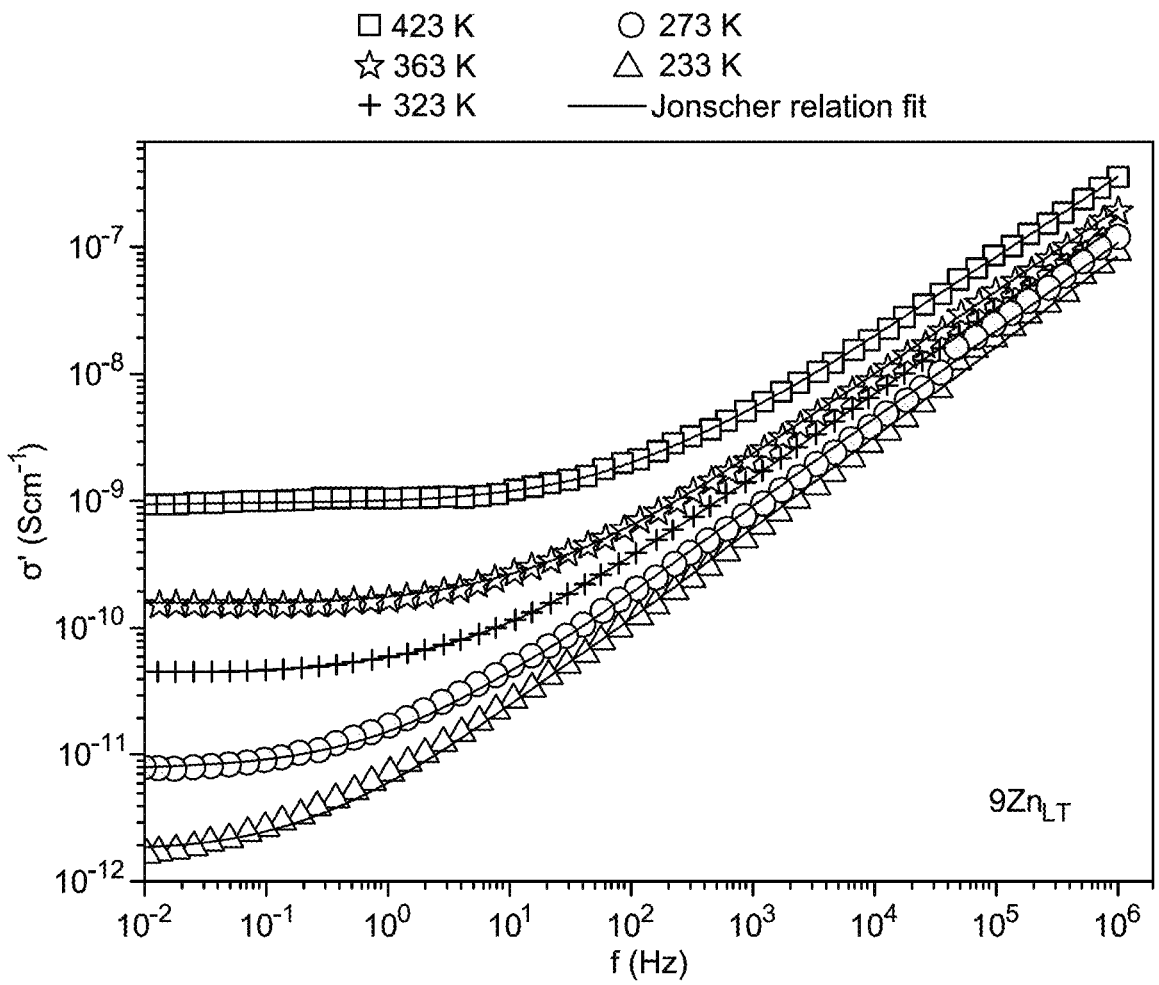
FIG. 8A depicts AC conductivity spectra for exemplar temperatures with the Jonscher relation fit results obtained for low temperature measurements for 9Zn, according to certain embodiments.
Figure 8B:
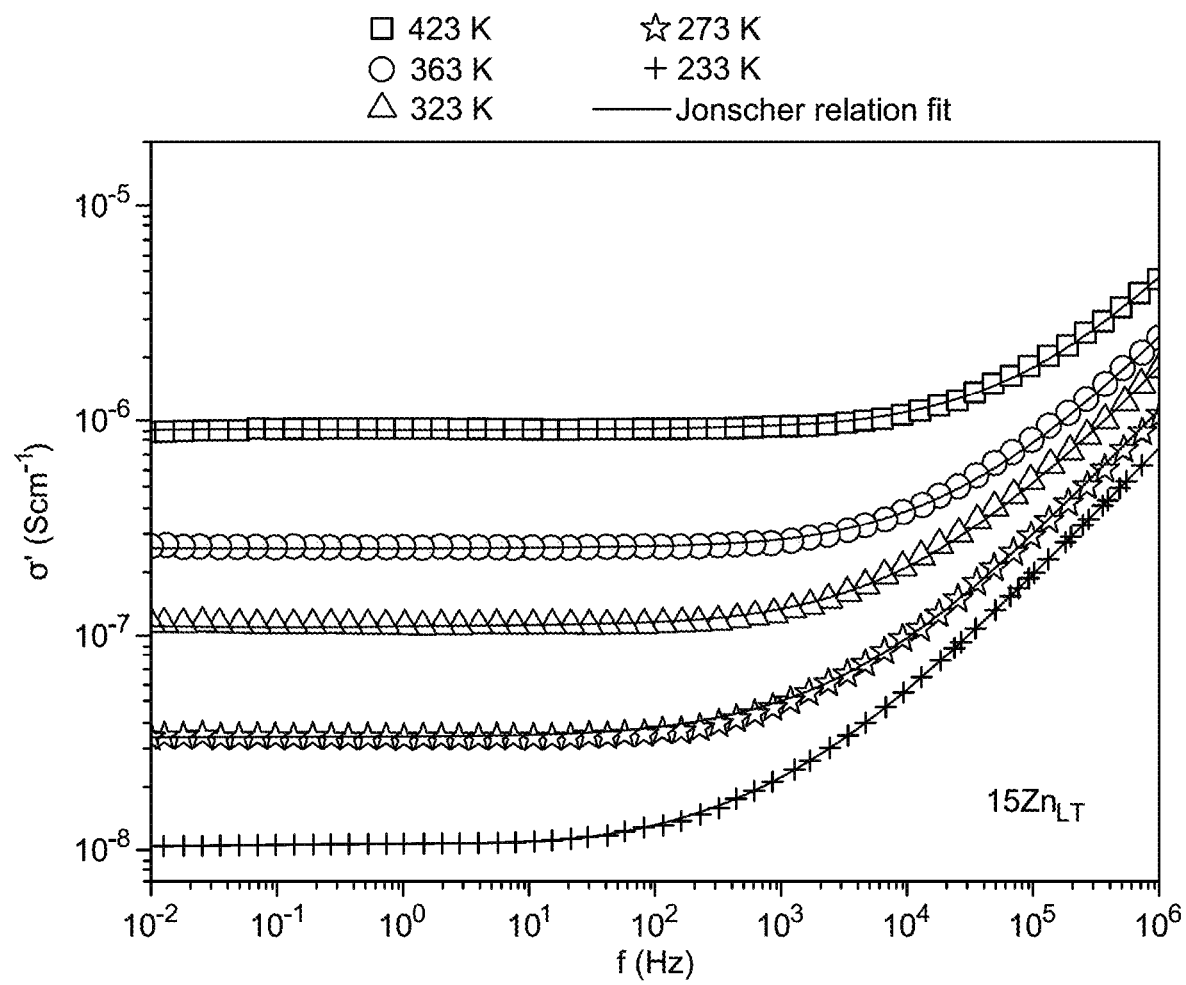
FIG. 8B depicts AC conductivity spectra for exemplar temperatures with the Jonscher relation fit results obtained for low temperature measurements for 15Zn, according to certain embodiments.
Figure 8C:
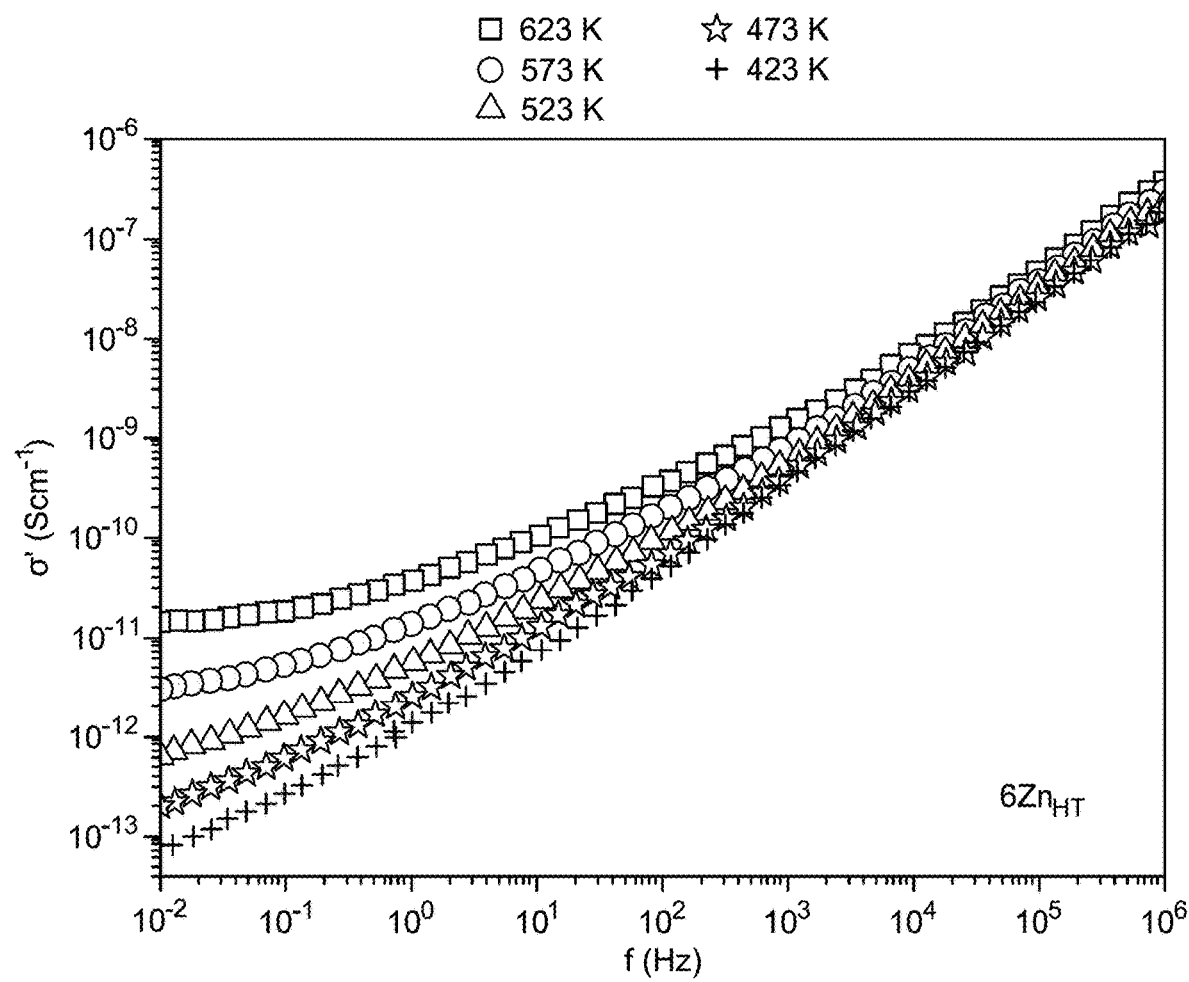
FIG. 8C depicts AC conductivity spectra for exemplar temperatures with the Jonscher relation fit results obtained for high temperature measurements for 6Zn, according to certain embodiments.
Figure 8D:
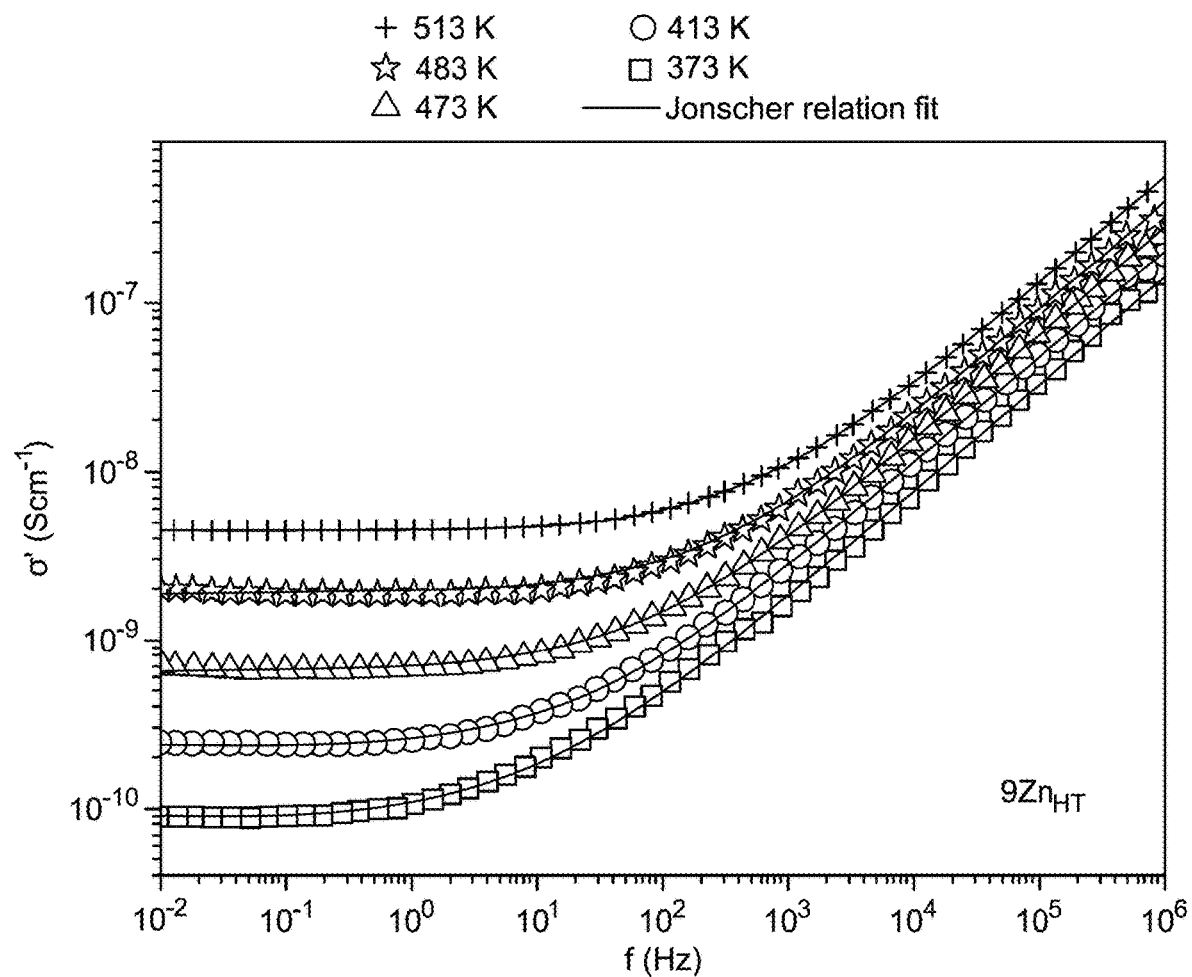
FIG. 8D depicts AC conductivity spectra for exemplar temperatures with the Jonscher relation fit results obtained for high temperature measurements for 9Zn, according to certain embodiments.
Figure 8E:
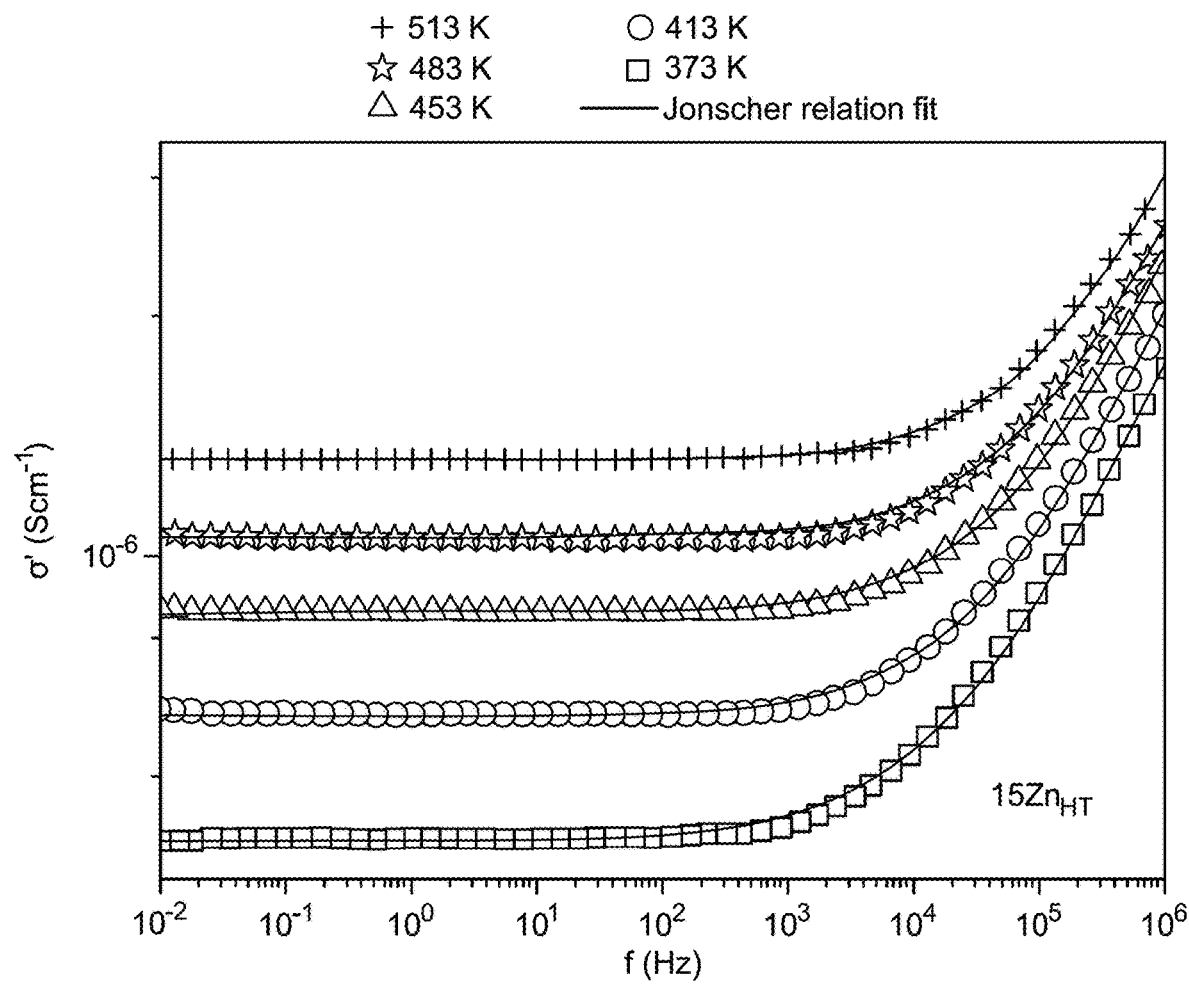
FIG. 8E depicts AC conductivity spectra for exemplar temperatures with the Jonscher relation fit results obtained for high temperature measurements for 15Zn, according to certain embodiments.

AC conductivity was studied at low-temperature (LT) and high-temperature (HT) regions under nitrogen and air atmospheres, respectively, and during heating and cooling. FIG. 7 displays temperature dependence of the samples at 100 Hz. AC conductivity mostly increases with an increase in temperature, which is observed for thermally activated conduction mechanisms like electron or ion hopping. For the 0Zn sample, the conductivity values are the lowest and were measurable only in the high temperature range above 373 K. The conduction process in this sample may result from the jumping of oxygen vacancies due to no other element being able to move in the glass aluminum-silicate matrix. Ca$^{2+}$ ions are usually strongly bound to the glass network, but there is a possibility that a small amount of the Ca$^{2+}$ ions move with oxygen vacancies. Adding a small amount of ZnO (3 wt. %) increases the conductivity by about one order of magnitude; therefore, it is possible to measure the AC conductivity at lower temperature ranges to 273 K for sample 3Zn. In the 3Zn sample, ZnO added in small amounts acts as a modifier in the glass lattice. The increase in ZnO increases the number of ions modifying the mobile lattice (Zn$^{2+}$) in the glass and may also affect the content of oxygen vacancies; therefore, the conductivity increases. The increase in ZnO content in 6Zn also affects the conductivity. The ZnO in 6Zn is observed as a separated crystal in XRD, as SEM supports the presence of longer and more connected paths rich in Zn. In 6Zn, the conductivity exhibits measurable values (above $10^{-12}$ S cm$^{-1}$) throughout the measured temperature range (from 153 K). The contribution to conductivity may have the free electron transport, which can occur in the crystalline ZnO phase. 9Zn exhibits AC conductivity values one order of magnitude higher than 6Zn. The conductivity values for 15Zn are in good agreement with sample 9Zn. The conductivity results from the content of crystalline ZnO. Electron conduction paths are more continuous and there are more electrons that are able to be transferred. Discrepancy in the conductivity measurement results observed for low-temperature measurements in nitrogen and high-temperature measurements in air for the last two samples (9Zn and 15Zn) may be correlated to the different electrodes used during the measurements: gold for low temperatures and platinum for high temperatures. The trend is changing, which may suggest that the conduction process is influenced by unlimited access to oxygen, which has a lowering effect at high temperatures (temperatures 373-423 K). This effect was not as pronounced in the case of samples with lower ZnO content. There is a possibility that in the 6Zn sample, the dominant conduction mechanism at low temperatures is electron transfer, and at high temperatures the access to oxygen changes the conduction mechanism to ionic. The sum of all processes occurring in the sample is obtained, the slower process dominates. This is why a decrease in conductivity is observed. Another explanation is that air relaxes the samples' structure due to the materials being synthesized in a vacuum during the manufacturing process; therefore, redox processes may occur, and the oxygen content in the sample may change. The structure in glass (0Zn) and 3Zn remains unchanged even after cooling after melting. 6Zn has a small amount of crystallinity; however, in ceramics produced in a vacuum, certain relaxation or oxidation processes may occur upon first contact with oxygen and simultaneous heating.

FIG. 7 shows the AC conductivity spectra for exemplar temperatures measured for 3Zn, 6Zn, 9Zn, and 15Zn at low and/or high temperatures. The conductivity increases with frequency over the entire temperature range for the 6Zn sample. A frequency-independent area is not visible. The content of crystalline ZnO is not high enough to create continuous conduction paths. Additionally, part of Zn is involved in the formation of $ZnAl_2O_4$ crystals, which are not semiconductors. The conduction paths on 6Zn are discontinuous, hence the observation of only AC conductivity and no DC conductivity at measured frequency and temperature ranges. Similar behavior is found for 3Zn and 0Zn. In the 9Zn sample, the content of crystalline ZnO is high enough to form continuous conduction paths; therefore, there is a part of the DC conductivity distinct from the low-frequency region. The DC conductivity part is visible from a temperature of 233 K up to the temperature limit of 513 K. The DC conductivity increases its frequency range with increasing temperature and becomes dominant for high-temperature measurements compared to the AC part. For 15Zn, the DC conductivity dominates even at a low temperature range.

The Jonscher power law, Eq. 1, was used to estimate DC conductivity values and other conduction parameters [Jonscher, A. K., The 'universal' dielectric response, Nature, 1977, 267, 673-679; and Andrew, K. J., Dielectric relaxation in solids, Journal of Physics D: Applied Physics, 1991, 32, R57, which are incorporated herein by references in their entireties]

$$\sigma'(\omega) = \sigma_{DC}(T) + A(T)\omega^{s(T)} \quad \text{(Eq. 1)}$$

The term $\sigma'(\omega)$ represents the frequency-dependent real part of conductivity, while ØDC denotes the frequency-independent direct current (DC) conductivity. A is a coefficient, and s is an exponent that depends on both temperature and material characteristics. $A\omega^s$ accounts for alternating current (AC) dispersion [Jonscher, A. K., The 'universal' dielectric response, Nature, 1977, 267, 673-679, which is incorporated herein by reference in its entirety]. Results of the fit are shown in FIGS. 8A-8E. There is good agreement of conductivity data with Eq. 1. DC conductivity values were determined based on the fitting results for 9Zn and 15Zn for the low- and high-temperature ranges and are summarized in FIG. 9A. DC conductivity increases with temperature for both samples, with 9Zn showing lower values in the low-temperature range (four orders of magnitude) than 15Zn in the high temperature range (over two orders of magnitude). Changes in direct current conductivity observed for the temperature dependence in both samples for the low and high temperature range are of different natures. For low temperatures, the conductivities do not obey Arrhenius' law, suggesting that their activation energy varies with temperature (FIG. 9C). Schnakenberg presented a theoretical model describing this behavior of electronic conductivity. According to the model of the nonadiabatic polaron hopping regime, the activation energy of conductivity varies with temperature, and the temperature dependence of DC conductivity takes the form of Eq. 2 [Schnakenberg, J., Polaronic Impurity Hopping Conduction, physica status solidi (b), 1968, 28, 623-633, which is incorporated herein by reference in its entirety]:

$$\sigma = \frac{A}{T}\sqrt{\sinh\left(\frac{h\vartheta}{kT}\right)}\exp^{-\frac{4W_H}{h\vartheta}\tanh\frac{h\vartheta}{4kT}}\exp^{-\frac{W_D}{kT}} \quad \text{(Eq. 2)}$$

A is a constant, k is Boltzmann's constant, ν is the phonon frequency, $W_H$ is the hopping energy, and $W_D$ is the structural disorder energy between the jump sites. The $W_H$ energy, also called the polaron binding energy, describes the depth of the potential well, and the $W_D$ energy is correlated with the strain energy [Sen, S. and Ghosh, A., Semiconducting properties of magnesium vanadate glasses, Journal of Applied Physics, 1999, 86, 2078-2082, which is incorporated herein by reference in its entirety]. The total activation energy needed to move an electron somewhere else includes both parts. Eq. 2 was used to fit the DC conductivity data in FIG. 9C and obtained a good agreement. Based on the obtained fitting results, it can be concluded that the energy of jump and structural disorder is lower for the 15Zn sample than for the 9Zn sample; however, the $W_H$ values are similar, indicating the same electronic conduction mechanism. This suggests that zinc ions form conductive paths in the crystalline ZnO phase, which is an electron semiconductor. In such situations, conduction takes place primarily in crystallites. For the 15Zn sample, which contains more ZnO than 9Zn, the distance between adjacent crystallites is smaller, hence the lower jump energy. Additionally, in the 9Zn sample, some Zn ions are involved in the non-conducting crystal phases of $ZnAl_2O_4$, and there is more dielectric matrix around the conductive phase, hence the higher disorder energy. At higher temperatures, activation energy stabilizes to a constant value, as shown in FIG. 9D. In this case, the application of the Schnakenberg equation did not give good results, so the Arrhenius equation (Eq. 3) was used, which also describes the electrical conductivity of semiconductors:

$$\sigma_{DC}T = \sigma_0 e^{-\frac{E_A}{kT}} \qquad (Eq.\ 3)$$

$\sigma_0$ represents the conductivity pre-exponential factor and $E_A$ represents the activation energy associated with the long-range diffusion of mobile charge. The estimated values of $E_A$ obtained from the fitting using Eq. 3 is seen in FIG. 9D. The activation energy for the DC process is still low, which suggests the dominance of electronic conductivity even at high temperatures, especially in the 15Zn sample. In the high temperature region, the activation energy, W, resulting from electron-lattice interactions and static disorder, can be described by relation Eq. 4.

$$W = W_H + \frac{W_D}{2},\ T > \frac{\theta_D}{2} \qquad (Eq.\ 4)$$

$\theta_D$ is a Debye temperature which can be estimated from the relation $\theta_D = h\nu/k$, where h is the Plank's constant [Mott, N. F., Conduction in glasses containing transition metal ions, *Journal of Non-Crystalline Solids*, 1968, 1, 1-17; and Emin, D., Small polarons, *Physics Today*, 1982, 35, 34-40, which are incorporated herein by references in their entireties]. The W values were calculated based on the Schnakenberg relation fitting results and obtained values of 0.69 eV for the 9Zn sample and 0.42 eV for the 15Zn sample. When comparing the estimated activation energy with the energy obtained from high temperature data, a slight overestimation can be observed. The differences in the activation energy and a change in the temperature behavior of conduction suggest a change in the conduction process from non-adiabatic polaron hopping to another [Wójcik, N. A. et al., Mechanism of hopping conduction in Be—Fe—Al—Te—O semiconducting glasses and glass-ceramics, *Journal of Materials Science*, 2022, 57, 1633-1647, which is incorporated herein by reference in its entirety]. Mott's single-phonon approach to small polaron hopping states that the activation energy at high temperatures should stabilize at a constant value. Differences in conductivity at low and high temperatures and as a result of oxygen access may be caused by varying participation of optical and acoustic phonons. Electrons interact strongly with the lattice, so their hopping is strongly related to lattice distortions caused by optical and acoustic phonons. The participation of the mentioned phonons changes with temperature changes. At high temperatures, optical phonons contribute mainly to conduction. In the middle-temperature range, both optical and acoustic phonons contribute to electron hopping, and at low temperatures, optical phonons are frozen [Okoczuk, P. et al., Increasing the conductivity of $V_2O_5$—$TeO_2$ glass by crystallization: structure and charge transfer studies, *Journal of Materials Science*, 2023, 58, 8700-8719, which is incorporated herein by reference in its entirety]. The electron-phonon coupling can also be dependent on oxygen access and be different for different modes [Slusarenko, V. et al., Temperature Dependence of the Oxygen Absorption Band in ZnTe:O, *physica status solidi (b)*, 1990, 161, 897-906; and Varshney, D. et al., Interpretation of Resistivity of $Nd_{1.85}Ce_{0.15}CuO_4$: Electron-Phonon Mechanism, *Journal of Superconductivity*, 2002, 15, 535-538, which are incorporated herein by references in their entireties].

Based on the Jonscher power law (Eq. 1), exponents for 9Zn and 15Zn were estimated at low and high temperatures. FIG. 9B shows the obtained "s" values as a function of temperature. The exponent "s" can be useful in predicting the conduction mechanism in glass-ceramics. For both samples, the "s" parameter ranges from 0.6 to 0.72. In 9Zn it slightly decreases with increasing temperature, while in sample 15Zn the behavior is opposite, but the changes are small. By comparing the values of the exponent "s" and its temperature behavior with the models [Elliott, S. R. et al., The diffusion-controlled relaxation model for ionic transport in glasses, *Philosophical Magazine B*, 1989, 60, 777-792, which is incorporated herein by reference in its entirety], it is observed that the conduction process may result from an overlap of the polaron tunneling mechanism and quantum mechanical tunneling between semiconductor ZnO crystallites in glass-ceramics.

Figure 9A:
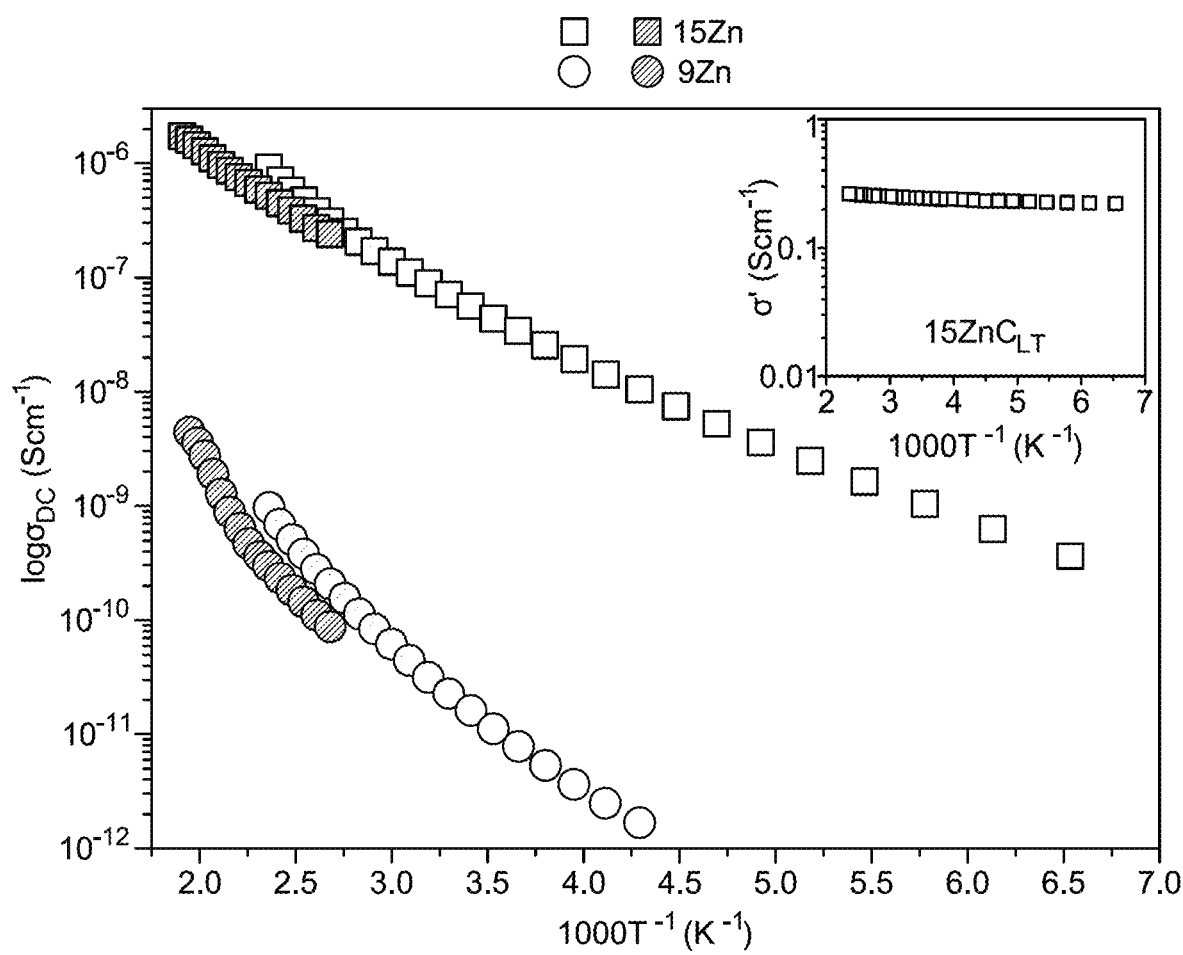
FIG. 9A depicts DC conductivity based on Jonscher power law (Eq. 1) as a function of temperature for 9Zn and 15Zn, according to certain embodiments.
Figure 9B:
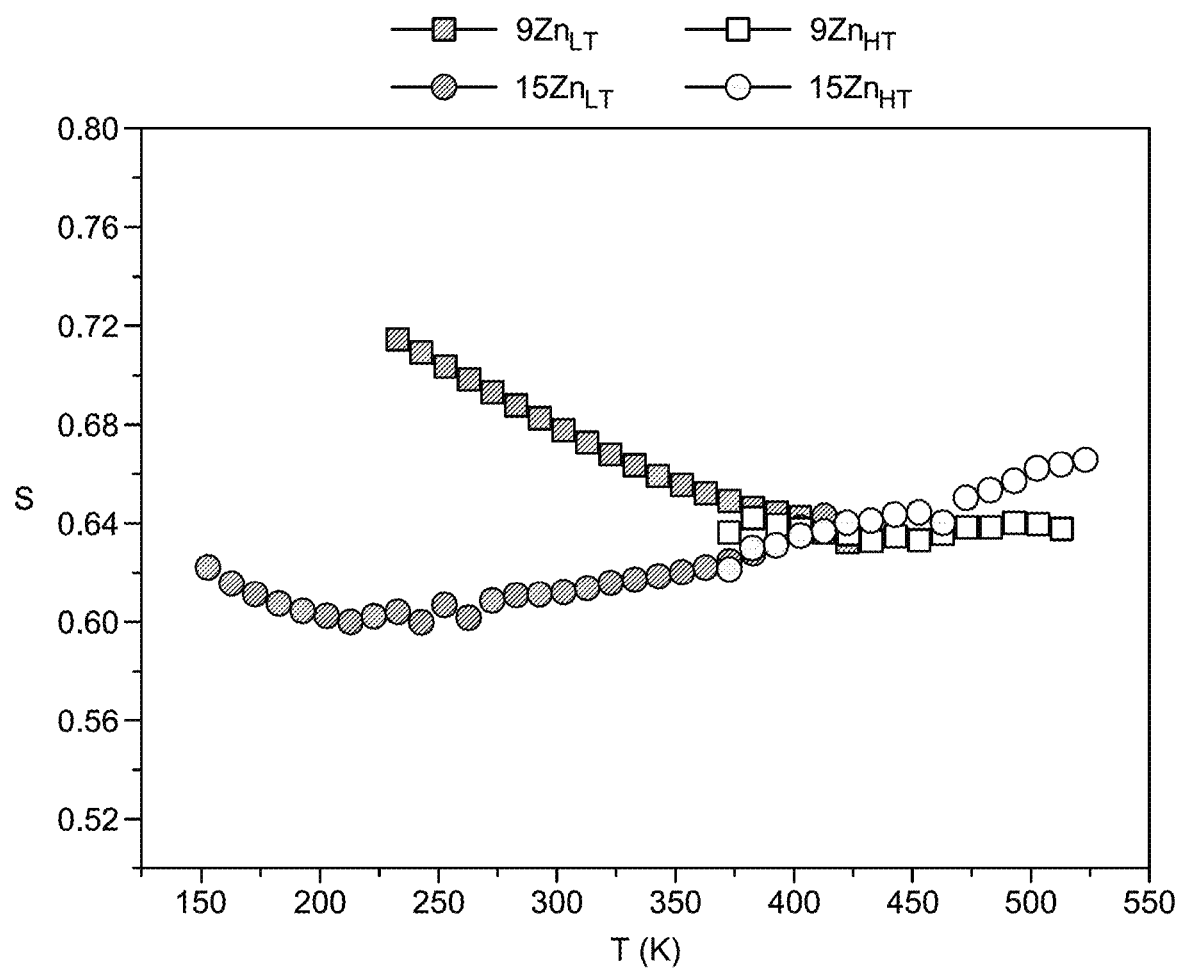
FIG. 9B depicts temperature dependence of the parameters from Eq. 1 for 9Zn and 15Zn, according to certain embodiments.
Figure 9C:
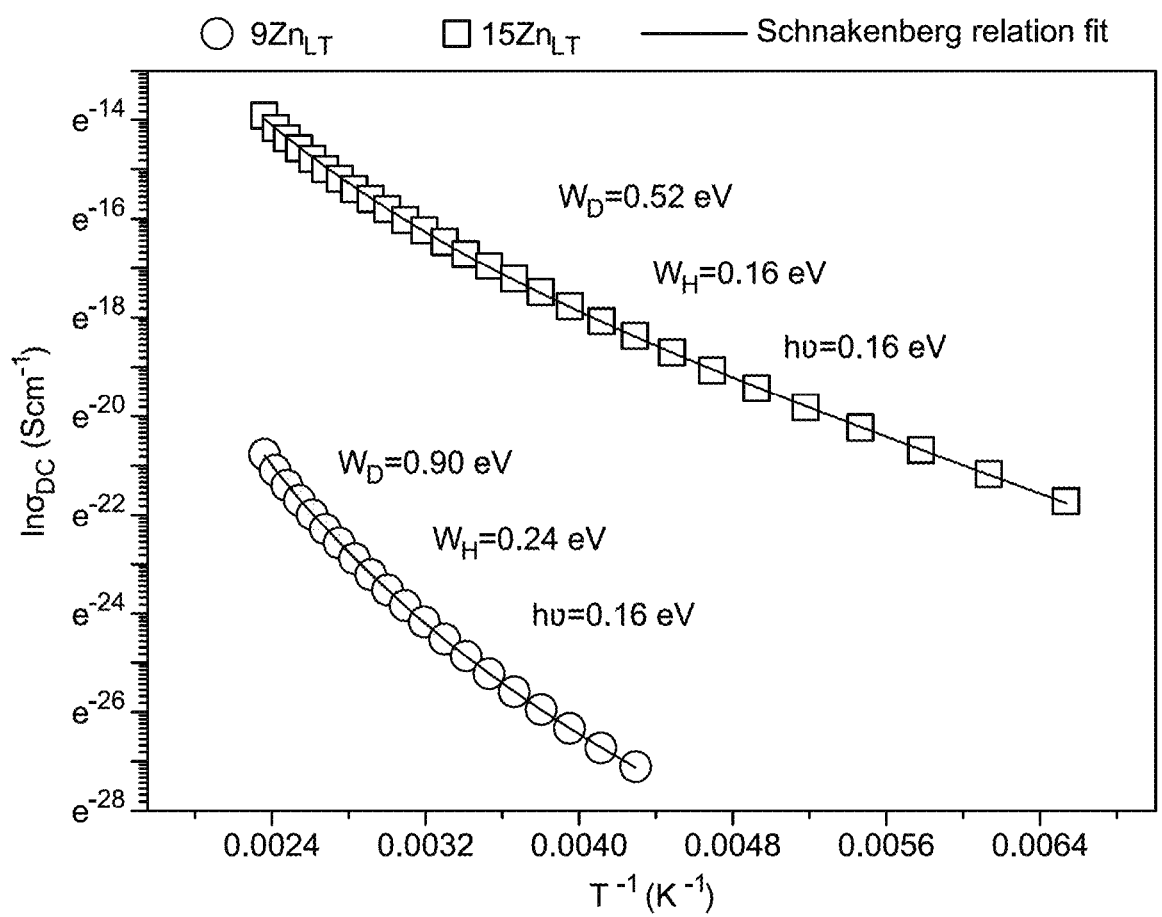
FIG. 9C depicts DC conductivity for a low temperature range with the fitting of Eq. 2, according to certain embodiments.
Figure 9D:
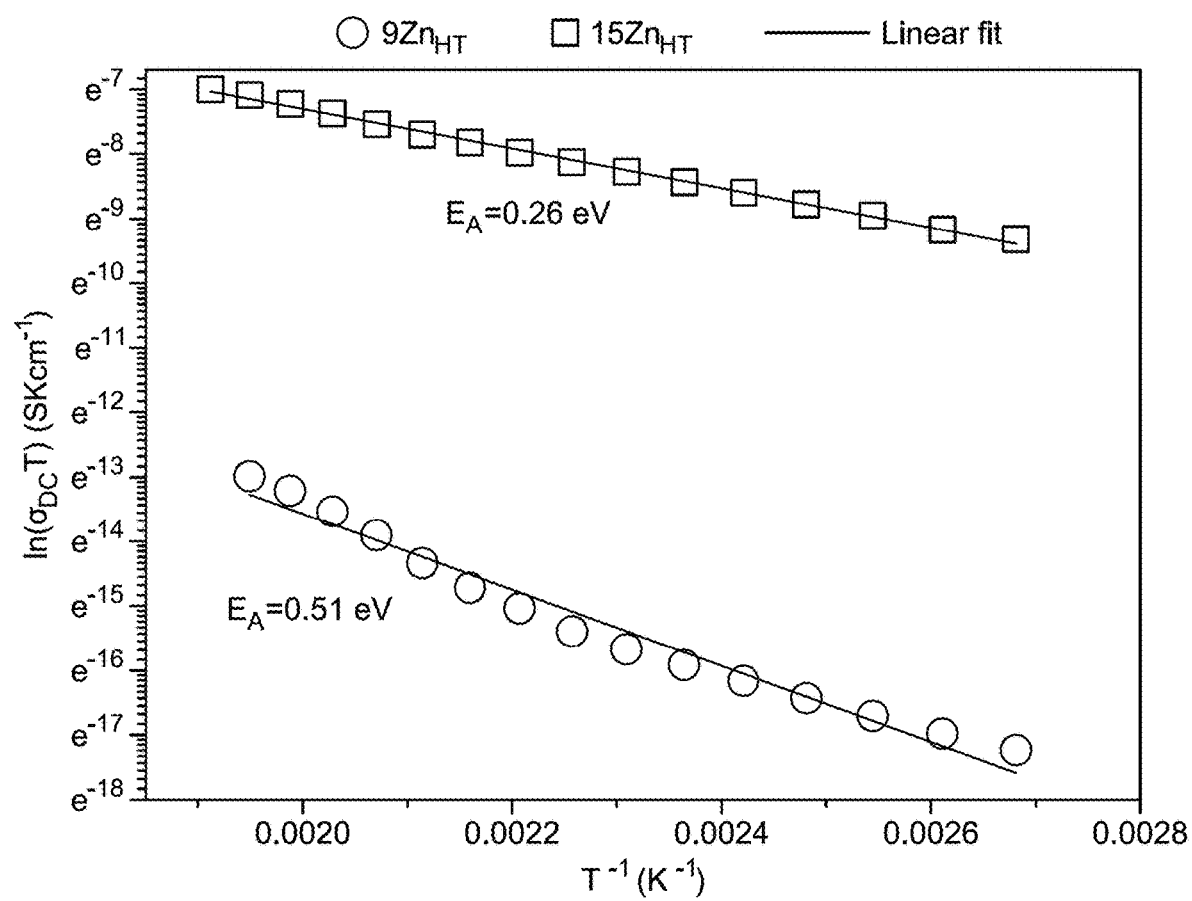
FIG. 9D depicts DC conductivity for a high temperature range with the fitting of Eq. 2, according to certain embodiments.

The inset in FIG. 9A depicts conductivity behavior of 15ZnC containing carbon nanotubes. The conductivity is DC for the range of frequency and temperature tested (153 to 473 K). Conductivity values are high and amount to 0.2 S $cm^{-1}$. This is a value for a good semiconductor, caused by the addition of carbon nanotubes, which have high electrical conductivity. In a CNT, each carbon atom is bonded to 3 other carbon atoms, and each atom has 1 free valence electron available for electrical conduction. This makes carbon nanotubes excellent conductors, and, at the nanoscale, some nanotubes have up to five times greater electrical conductivity than copper [Wiśniewska, P. et al., Rubber wastes recycling for developing advanced polymer composites: A warm handshake with sustainability, *Journal of Cleaner Production*, 2023, 427, 139010; and Lekawa-Raus, A. et al., Electrical Properties of Carbon Nanotube Based Fibers and Their Future Use in Electrical Wiring, *Advanced Functional Materials*, 2014, 24, 3661-3682, which are incorporated herein by references in their entireties]. Adding a small amount (15 wt. %) of carbon nanotubes in a ZnO-doped semiconductor increases electrical conductivity.

Figure 10A:
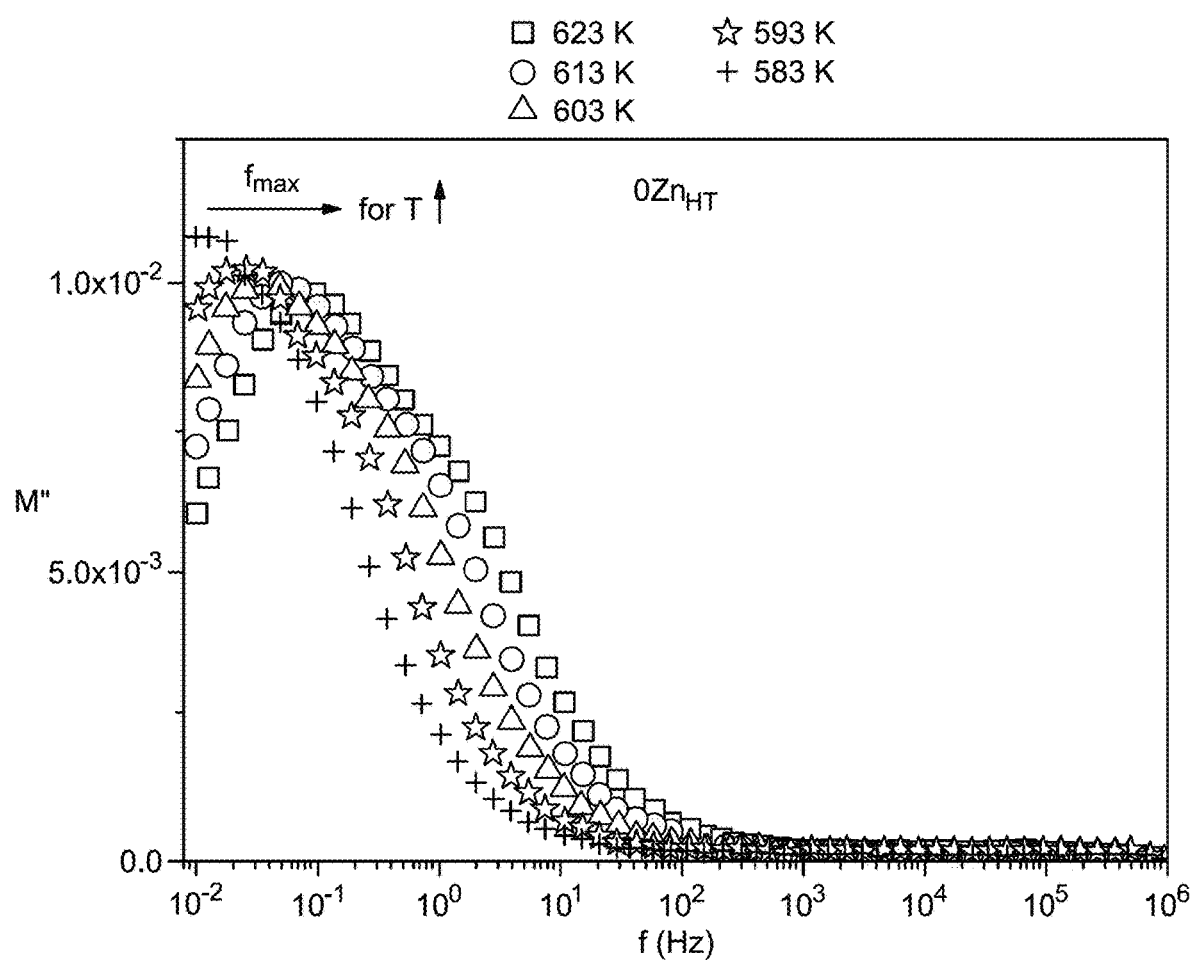
FIG. 10A depicts electric modulus (M") versus frequency for exemplar temperatures for 0Zn, according to certain embodiments.
Figure 10B:
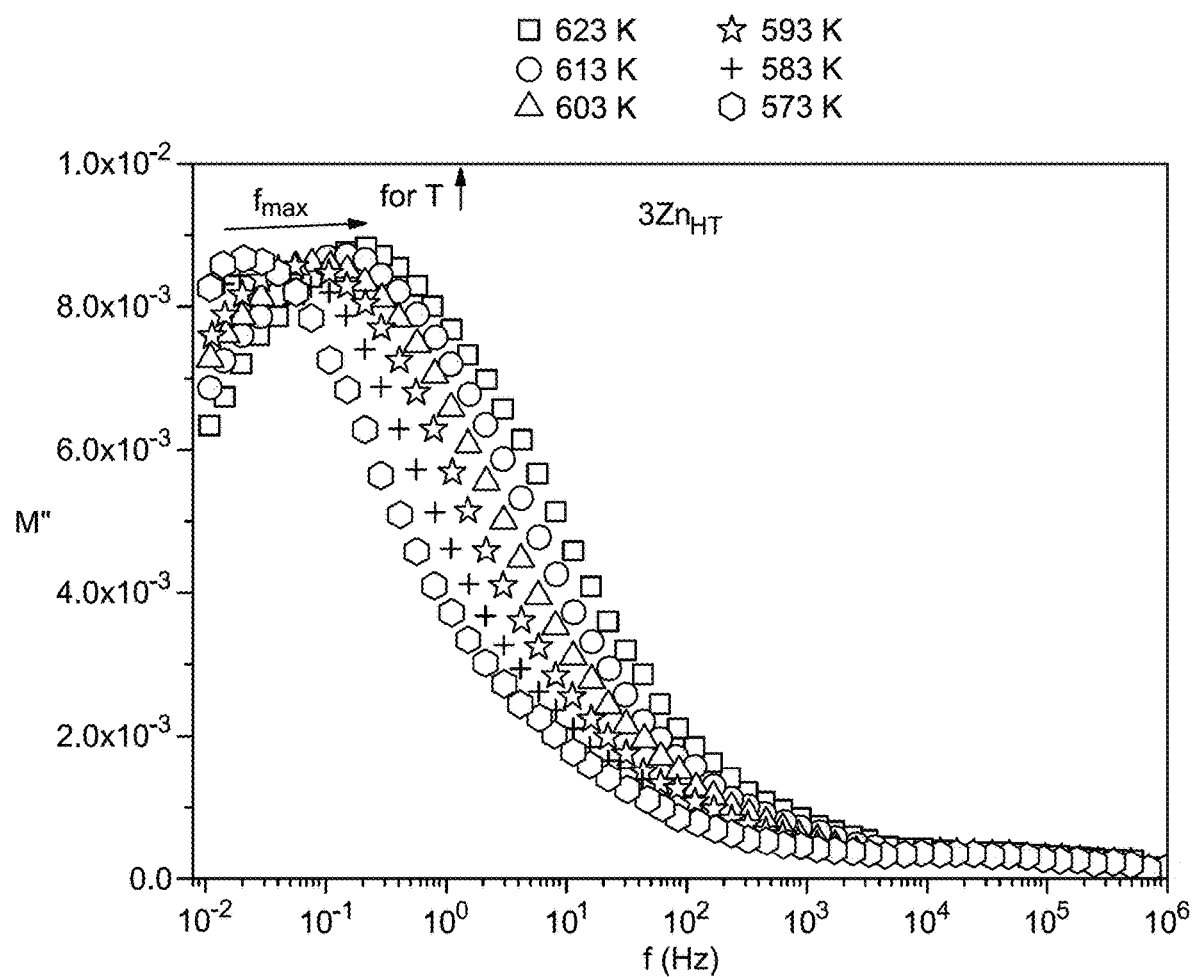
FIG. 10B depicts electric modulus (M") versus frequency for exemplar temperatures for 3Zn, according to certain embodiments.
Figure 10C:
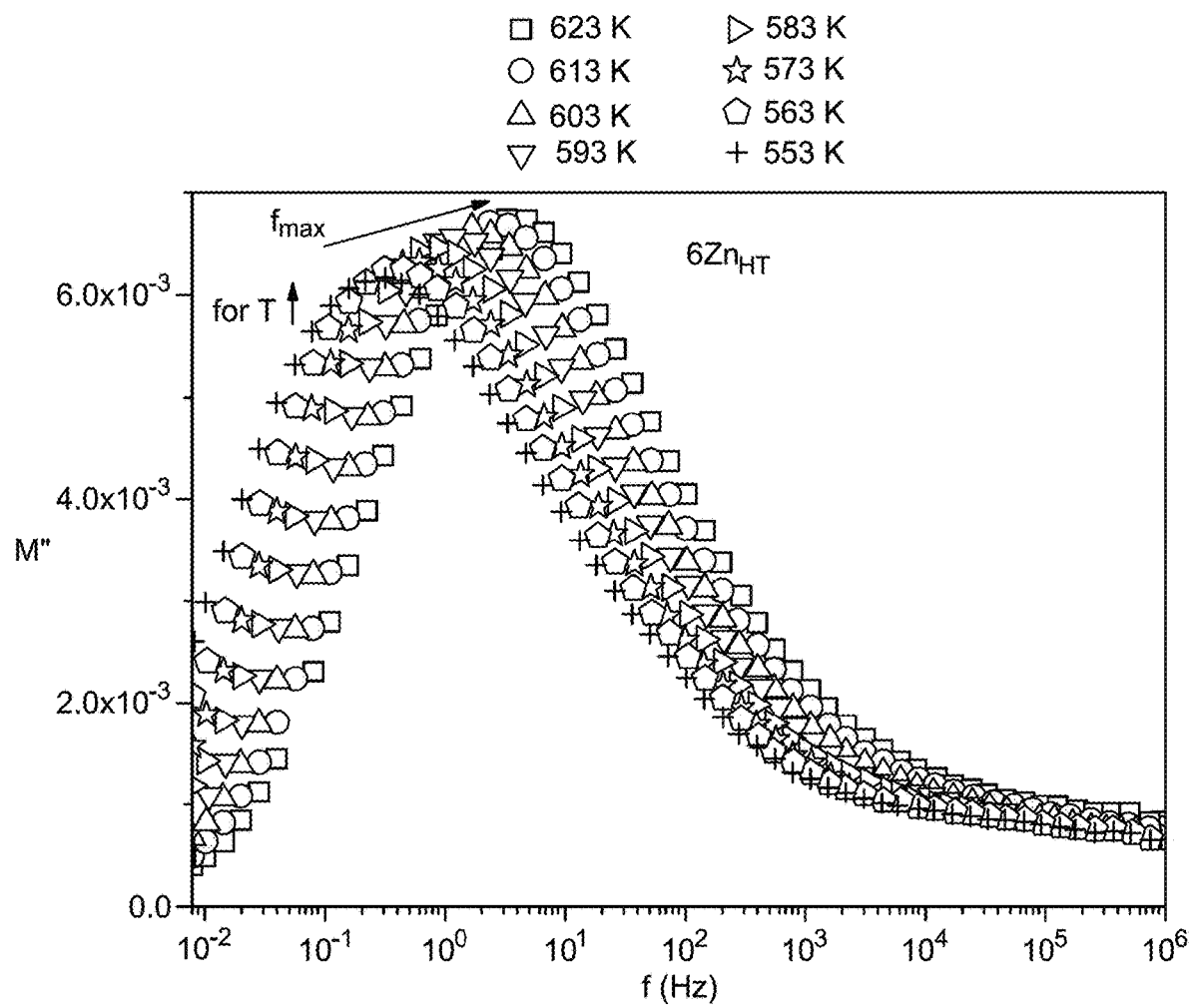
FIG. 10C depicts electric modulus (M") versus frequency for exemplar temperatures for 6Zn, according to certain embodiments.
Figure 10D:
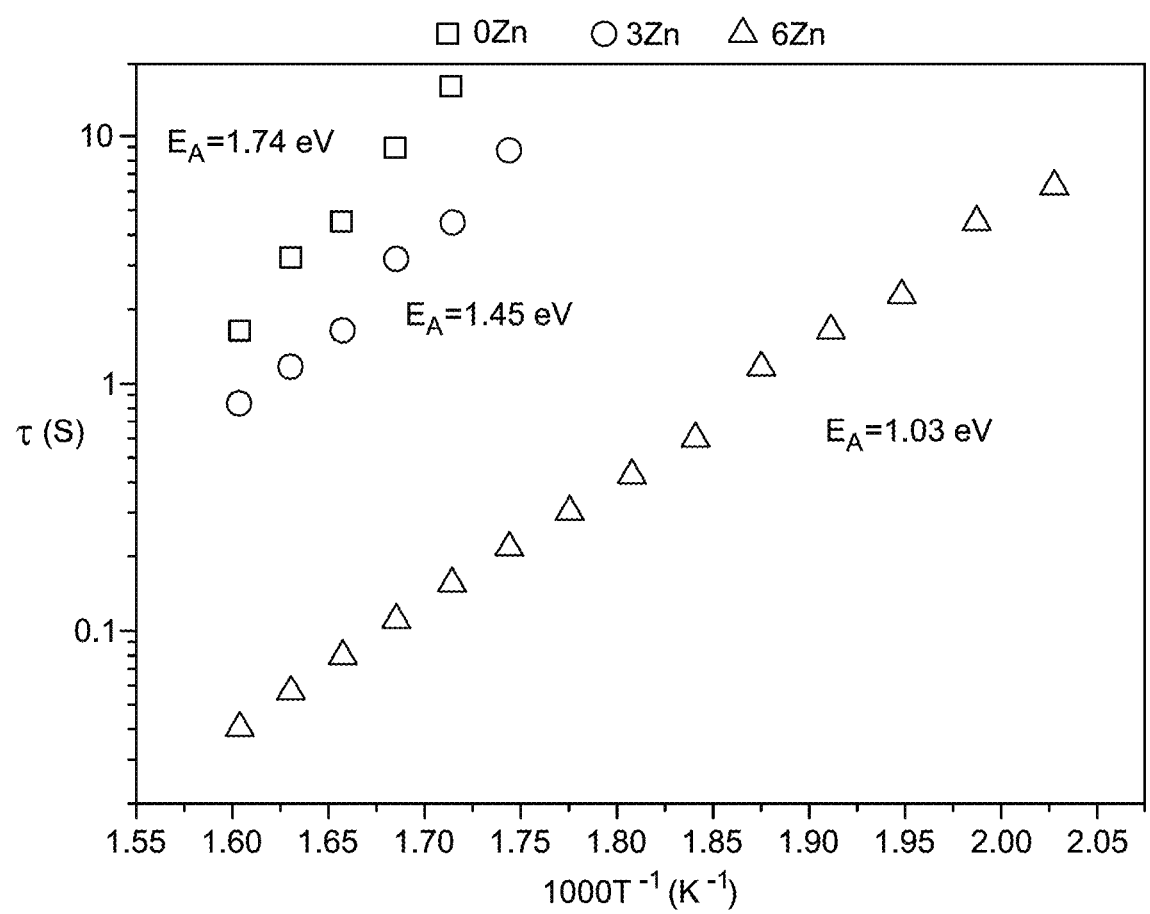
FIG. 10D depicts variations of t as a function of temperature for 0Zn, 3Zn and 6Zn, according to certain embodiments.

DC conductivity was not able to be determined for 0Zn, 3Zn, and 6Zn. Instead, behavior of the modulus parameter was analyzed to compare them. Electrical modulus formalism is employed to investigate the electrical relaxation mechanism in ion-conducting materials [Mtioui, O. et al., Thermal behavior and dielectric and vibrational studies of $Cs_2(HAsO_4)0.32(SO_4)0.68\cdot Te(OH)_6$, *Ionics*, 2015, 21, 411-420, which is incorporated herein by reference in its entirety]. An advantage of this approach is that it suppresses the effects of electrode polarization. The electrical modulus can be mathematically represented as follows: $M^* = M' + jM$ [Soares, B. G. et al., Dielectric behavior of polyaniline synthesized by different techniques, *European Polymer Journal*, 2006, 42, 676-686, which is incorporated herein by reference in its entirety]. FIGS. 10A-10C depicts the imaginary part of electric modulus (M") as a function of frequency for different temperatures for samples 0Zn, 3Zn, and 6Zn, respectively. The plots exhibit a relaxation peak. As the temperature increases, the peak shifts towards higher frequencies. The asymmetry observed in the broadening of the peak indicates a range of relaxation times with varying time constants, which is indicative of non-Debye-type relaxation in the materials. The position of peak frequency, $f_{max}$, was determined for each temperature and converted to relaxation time, $\tau$. The dependence between $\tau$ and temperature is illustrated in FIG. 10D. The dependence may be described by the Arrhenius law, as described by equation 5:

$$\tau = \tau_0 e^{-\frac{E_A}{kT}} \qquad \text{(Eq. 5)}$$

$\tau_0$ is a pre-exponential factor and $E_A$ is the activation energy for the relaxation process. The estimated activation energy values exceeded 1 eV, suggesting a conduction process resulting from ion hopping. The conduction process may be due to the hop of oxygen vacancies. Doping with ZnO decreases the relaxation time and the activation energy, suggesting the creation of more oxygen vacancies or the presence of an additional conduction process.

CaAlSiON glass-ceramics with varying ZnO contents were synthesized via spark plasma sintering. Zn-containing samples exhibited an increase in crystalline phases with higher in ZnO content. Doping with ZnO influenced material properties, such as density and thermal expansion values. Addition of ZnO to the glass or glass-ceramic materials impacts electrical conductivity. Dopant quantity affects the electrical properties. Glass-ceramic materials with a minimum 9 wt. % ZnO showed measurable DC conductivity. AC conductivity analysis using the Jonscher relation and DC conductivity values aligned with the Schnakenberg model for low temperatures and the Arrhenius equation for high temperatures. A transition from oxygen ion dominance to electron transfer is observed with increasing ZnO content, along with the formation of continuous conduction paths. This suggests a complex interplay of factors influencing the electrical properties of these materials. Conductivity in glass without ZnO and glass-ceramics with a small amount of ZnO is governed largely by the transfer of oxygen ions with a minor contribution to electronic conductivity. This suggests that the movement of ions, particularly oxygen ions, plays a role in the conductivity of these materials. As the content of ZnO increases, continuous conduction paths are formed between ZnO crystallites. With the increasing content of ZnO, the conductivity shifts from being largely dominated by the transfer of oxygen ions to being largely dominated by electron transfer. This shift indicates a change in the dominant mechanism of conductivity in the material as ZnO content increases.

Numerous modifications and variations of the present disclosure are possible in light of the above teachings. It is therefore to be understood that within the scope of the appended claims, the disclosure may be practiced otherwise than as specifically described herein.

The invention claimed is:

1. A glass-ceramic material, comprising:
   an oxynitride glass with a chemical formula $Ca_7Al_{14}Si_{17}O_{52}N_7$; and
   zinc oxide,
   wherein the zinc oxide is present in an amount of 8 to 16 percent by weight based on a total weight of the glass-ceramic material,
   wherein the zinc oxide is doped in the oxynitride glass,
   wherein the glass-ceramic material has one or more conductive channels having a length of 100 to 1000 μm and a width of 0.5 to 10 μm.

2. The glass-ceramic material of claim 1, wherein the one or more conductive channels have one or more distributary channels and the conductive channels form a conductive network.

3. The glass-ceramic material of claim 1, wherein the one or more conductive channels comprise voids having a length of 0.5 to 5 μm and a width of 0.1 to 0.5 μm.

4. The glass-ceramic material of claim 1, wherein the glass-ceramic material is made by a process comprising:
   heating a calcium oxide, an aluminum oxide, a silicon oxide, and a silicon nitride in an inert atmosphere to a temperature of 1500 to 1700° C. to form the oxynitride glass;
   grinding the oxynitride glass and adding zinc oxide to form a mixture;
   sintering the mixture at a pressure of 15 to 25 MPa and to a temperature of 500 to 1000° C. at a heating rate of 50 to 200° C./minute to form the glass-ceramic material; and
   polishing the glass-ceramic material.

5. The glass-ceramic material of claim 4, wherein the sintering is a spark plasma sintering process.

6. The glass-ceramic material of claim 1, wherein the glass-ceramic material has a density of 2.75 to 2.95 g cm$^{-3}$.

7. The glass-ceramic material of claim 1, wherein the glass-ceramic material has a thermal expansion of 4.5 to 5.0 ppm μm$^{-1}$.

8. The glass-ceramic material of claim 1, wherein the glass-ceramic material has a thermal conductivity of 1.5 to 1.75 W m$^{-1}$ K$^{-1}$.

9. The glass-ceramic material of claim 1, wherein the glass-ceramic material has an atomic ratio of aluminum to aluminum and silicon of 0.4 to 0.5.

10. The glass-ceramic material of claim 1, wherein the glass-ceramic material further comprises europium.

11. The glass-ceramic material of claim 1, wherein the glass-ceramic material further comprises carbon nanotubes.

12. The glass-ceramic material of claim 1, wherein the glass-ceramic material has 9 percent by weight zinc oxide and an activation energy of 0.6 to 0.8 eV.

13. The glass-ceramic material of claim 1, wherein the glass-ceramic material has 15 percent by weight zinc oxide and an activation energy of 0.3 to 0.5 eV.

14. The glass-ceramic material of claim 11, wherein the glass-ceramic material has a DC conductivity value of 0.1 to 0.3 S/cm.

15. The glass-ceramic material of claim 1, wherein the conductive channels form a conductivity path that is an electron transfer path.

16. The glass-ceramic material of claim 1, wherein the glass-ceramic material has 9 percent by weight zinc oxide and a hopping energy of 0.2 to 0.3 eV.

17. The glass-ceramic material of claim 1, wherein the glass-ceramic material has 9 percent by weight zinc oxide and a structural disorder energy between jump sites of 0.8 to 1.0 eV.

18. The glass-ceramic material of claim 1, wherein the glass-ceramic material has 15 percent by weight zinc oxide and a hopping energy of 0.1 to 0.2 eV.

19. The glass-ceramic material of claim 1, wherein the glass-ceramic material has 15 percent by weight zinc oxide and a structural disorder energy between jump sites of 0.4 to 0.6 eV.

20. The glass-ceramic material of claim 1, wherein the glass-ceramic material is conductive from 200 to 550 K.

* * * * *